(12) United States Patent
Miess et al.

(10) Patent No.: US 7,951,213 B1
(45) Date of Patent: May 31, 2011

(54) SUPERABRASIVE COMPACT, DRILL BIT USING SAME, AND METHODS OF FABRICATING SAME

(75) Inventors: David P. Miess, West Highland, UT (US); Kenneth E. Bertagnolli, South Sandy, UT (US); Craig H. Cooley, Saratoga Springs, UT (US)

(73) Assignee: US Synthetic Corporation, Orem, UT (US)

( * ) Notice: Subject to any disclaimer, the term of this patent is extended or adjusted under 35 U.S.C. 154(b) by 765 days.

(21) Appl. No.: 11/891,077

(22) Filed: Aug. 8, 2007

(51) Int. Cl.
  B24D 3/02 (2006.01)
  C09C 1/68 (2006.01)
  C09K 3/14 (2006.01)
  B24B 1/00 (2006.01)
  E21B 10/36 (2006.01)

(52) U.S. Cl. ........... 51/307; 51/295; 51/309; 175/420.2; 175/428; 175/430

(58) Field of Classification Search .................... 51/295, 51/307, 309; 175/420.2, 428, 430
See application file for complete search history.

(56) References Cited

U.S. PATENT DOCUMENTS

| | | | |
|---|---|---|---|
| 4,268,276 A | 5/1981 | Bovenkerk |
| 4,274,900 A | 6/1981 | Mueller et al. |
| 4,311,490 A | 1/1982 | Bovenkerk et al. |
| 4,410,054 A | 10/1983 | Nagel et al. |
| 4,468,138 A | 8/1984 | Nagel |
| 4,560,014 A | 12/1985 | Geczy |
| 4,604,106 A | 8/1986 | Hall et al. |
| 4,738,322 A | 4/1988 | Hall et al. |
| 4,766,040 A | 8/1988 | Hillert et al. |
| 4,811,801 A | 3/1989 | Salesky et al. |
| 4,861,350 A | 8/1989 | Phaal et al. |
| 4,913,247 A | 4/1990 | Jones |
| 5,011,514 A | 4/1991 | Cho et al. |
| 5,016,718 A | 5/1991 | Tandberg |
| 5,092,687 A | 3/1992 | Hall |
| 5,120,327 A | 6/1992 | Dennis |
| 5,135,061 A | 8/1992 | Newton, Jr. |
| 5,154,245 A | 10/1992 | Walderstrom et al. |

(Continued)

FOREIGN PATENT DOCUMENTS

WO  WO 00/38864  *  6/2000

OTHER PUBLICATIONS

U.S. Appl. No. 60/850,969, Craig H. Cooley et al.

*Primary Examiner* — Anthony J Green
*Assistant Examiner* — Pegah Parvini
(74) *Attorney, Agent, or Firm* — Workman Nydegger

(57) ABSTRACT

Superabrasive compacts, methods of fabricating such compacts, and drilling tools that may utilize such compacts are disclosed. In one aspect of the present invention, a superabrasive compact includes a substrate and a superabrasive table attached to the substrate. At least one constituent of the superabrasive table exhibits a substantially monotonic distribution of size, concentration, or both in a selected direction of the superabrasive table. In another aspect of the present invention, a method of fabricating a superabrasive article is disclosed. A plurality of particles may be provided that exhibit a substantially monotonic distribution of particle size, concentration, or both in a selected direction. The particles may be subjected to a high-temperature, high-pressure process to consolidate and form a self-supporting body.

18 Claims, 18 Drawing Sheets

U.S. PATENT DOCUMENTS

| | | |
|---|---|---|
| 5,364,192 A | 11/1994 | Damm et al. |
| 5,368,398 A | 11/1994 | Damm et al. |
| 5,460,233 A | 10/1995 | Meany et al. |
| 5,468,268 A | 11/1995 | Tank et al. |
| 5,480,233 A | 1/1996 | Cunningham |
| 5,505,748 A | 4/1996 | Tank et al. |
| 5,544,713 A | 8/1996 | Dennis |
| 5,645,617 A * | 7/1997 | Frushour ................ 51/309 |
| 5,762,841 A | 6/1998 | Shimai et al. |
| 5,855,996 A | 1/1999 | Corrigan et al. |
| 6,132,675 A | 10/2000 | Corrigan et al. |
| 6,793,681 B1 | 9/2004 | Pope et al. |
| 2006/0162967 A1 | 7/2006 | Brackin et al. |
| 2010/0014931 A1 | 1/2010 | Matthias |

* cited by examiner

SUPERABRASIVE COMPACT, DRILL BIT USING SAME, AND METHODS OF FABRICATING SAME

TECHNICAL FIELD

Embodiments of the present invention relate to superabrasive compacts, such as polycrystalline-diamond compacts ("PDC"), and applications utilizing such compacts in drilling tools and components, machining equipment, bearing apparatuses, wire-drawing dies, and other apparatuses.

BACKGROUND

Wear-resistant, superabrasive compacts are utilized in a variety of mechanical applications. For example, polycrystalline diamond ("PCD") superabrasive compacts are used in drilling tools (e.g., compacts, cutting elements, gage trimmers, etc.), machining equipment, bearing apparatuses, wire-drawing machinery, and in other mechanical systems.

PDCs have found particular utility as superabrasive cutting elements in rotary drill bits, such as roller cone drill bits and fixed cutter drill bits. A PDC cutting element or cutter typically includes a superabrasive diamond layer or table. The diamond table is formed and bonded to a substrate using an ultra-high pressure, ultra-high temperature ("HPHT") process. The substrate is often brazed or otherwise joined to an attachment member such as a stud or a cylindrical backing. A stud carrying the PDC may be used as a PDC cutting element when mounted to a rotary drill bit by press-fitting, brazing, or otherwise securing the stud into a receptacle formed in the rotary drill bit. The PDC cutting element may also be brazed directly into a preformed pocket, socket, or other receptacle formed in the rotary drill bit. Generally, a rotary drill bit may include a number of PDC cutting elements affixed to the drill bit body.

Conventional PDCs are normally fabricated by placing a cemented-carbide substrate into a container or cartridge with one or more layers of diamond particles or crystals positioned on a surface of the cemented-carbide substrate. Often, at least two layers of diamond particles are used to tailor the mechanical properties of the resultant PDC. Typically, a number of such cartridges are loaded into a HPHT press. The substrates and the layers of diamond particles are then processed under HPHT conditions in the presence of a catalyst material that causes the diamond particles to bond to one another to form a matrix of bonded diamond grains defining a diamond table. The catalyst material is often a solvent catalyst, such as cobalt, nickel, or iron that is used for facilitating the intergrowth of the diamond particles.

In one conventional approach, a constituent of the cemented-carbide substrate, such as cobalt from a cobalt-cemented tungsten carbide substrate, liquefies and sweeps from the region adjacent to the volume of diamond particles into interstitial regions between the diamond particles during the HPHT process. The cobalt acts as a catalyst to facilitate intergrowth between the diamond particles, which results in formation of bonded diamond grains. Often, a solvent catalyst may be mixed with the diamond particles prior to subjecting the diamond particles and substrate to the HPHT process.

The solvent catalyst dissolves carbon from the diamond particles or portions of the diamond particles that graphitize due to the high temperature being used in the HPHT process. The solubility of the stable diamond phase in the solvent catalyst is lower than that of the metastable graphite under HPHT conditions. As a result of this solubility difference, the undersaturated graphite tends to dissolve into solvent catalyst and the supersaturated diamond tends to deposit onto existing diamond particles to form diamond-to-diamond bonds. Accordingly, diamond grains become mutually bonded to form a matrix of PCD with interstitial regions between the bonded diamond grains being occupied by the solvent catalyst.

When the diamond table is formed from a number of different layers of diamond particles with distinctly different particles size distributions, the resultant HPHT-processed diamond table comprises a number of distinct layers. Each of the layers of diamond has a different average grain size. While layering diamond grain sizes in the diamond table is often performed to improve the mechanical properties of the diamond table, the layering can introduce undesirable stress concentrations between adjacent diamond layers and/or between one of the diamond layers and the substrate. The diamond tables often fail during use by delaminating at the interface between adjacent diamond layers. Moreover, even when the diamond table comprises only a single layer of diamond, the diamond table can often delaminate at the interface between the substrate and the diamond table.

SUMMARY

Superabrasive compacts, methods of fabricating such compacts, and drilling tools that utilize such compacts are disclosed. In one aspect of the present invention, a superabrasive compact includes a substrate and a superabrasive table attached to the substrate. At least one constituent of the superabrasive table exhibits a substantially monotonic distribution of size, concentration, or both in a selected direction of the superabrasive table. In one embodiment of the present invention, the at least one constituent may comprise superabrasive grains. In another embodiment of the present invention, the at least one constituent may comprise secondary particles, such as metal-carbide particles or cemented metal-carbide particles.

In another aspect of the present invention, a method of fabricating a superabrasive article is disclosed. A plurality of particles (e.g., superabrasive particles, secondary particles, etc.) may be provided that exhibit a substantially monotonic distribution of particle size, concentration, or both in a selected direction. The particles may be subjected to a high-temperature, high-pressure process to consolidate and form a self-supporting body.

Additional aspects of the present invention are directed to applications utilizing the disclosed superabrasive compacts in various articles and apparatuses, such as rotary drill bits, machining equipment, bearing apparatuses, wire-drawing dies, and other articles and apparatuses.

BRIEF DESCRIPTION OF THE DRAWINGS

The drawings illustrate various embodiments of the present invention, wherein like reference numerals refer to like or similar elements in different views or embodiments shown in the drawings.

DETAILED DESCRIPTION

Various embodiments of the present invention are directed to superabrasive compacts, methods of fabricating such compacts, and drilling tools that may utilize such compacts. The superabrasive compacts disclosed herein may be used in a variety of applications, such as drilling tools (e.g., superabrasive cutting elements, gage trimmers, etc.), machining equipment, bearing apparatuses, wire-drawing machinery, and other apparatuses. As used herein, the term "superabrasive" means a material that exhibits a hardness exceeding a hardness of tungsten carbide.

FIGS. 1-5 show various embodiments of the present invention directed to a superabrasive compact comprising a superabrasive table including at least one constituent (e.g., superabrasive grains, metal-carbide particles, cemented metal-carbide particles) that exhibits a substantially monotonic distribution of size, concentration, or both in a selected direction of the superabrasive table. A schematic microstructural representation is superimposed on the superabrasive tables shown in FIGS. 1-5. However, it is noted that the depicted microstructures are merely for illustrative purposes and are not drawn to scale.

Figure 1:
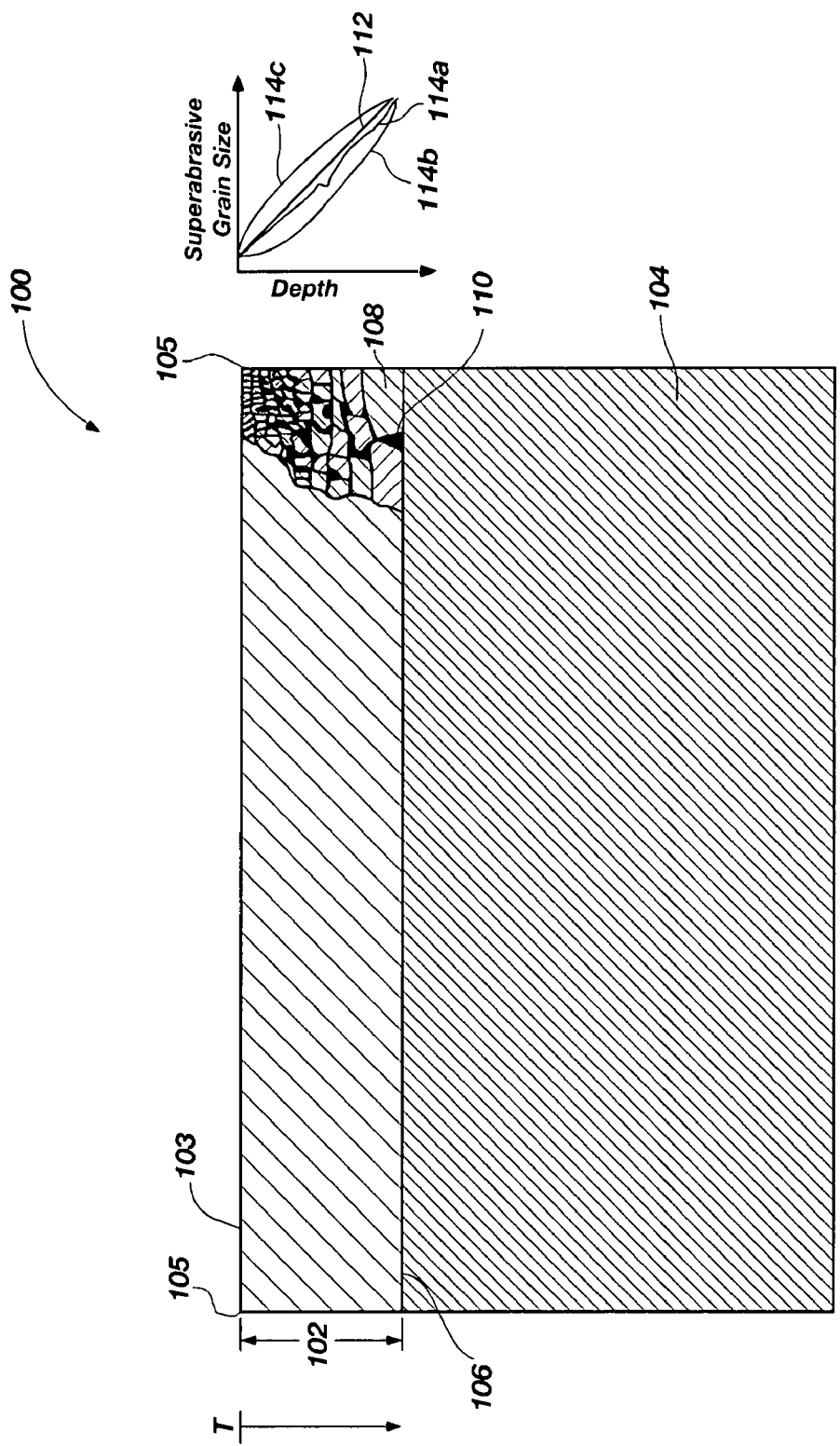
FIG. 1 is a schematic cross-sectional view of a superabrasive compact including a superabrasive table exhibiting a substantially monotonic grain size distribution of superabrasive grains in a selected direction according to one embodiment of the present invention.

FIG. 1 is a schematic cross-sectional view of a superabrasive compact 100 according to one embodiment of the present invention. The superabrasive compact 100 comprises a superabrasive table 102 bonded to a substrate 104, with the superabrasive table 102 including an upper surface 103 and an edge 105. The superabrasive compact 100 further includes an interfacial surface 106 formed between the superabrasive table 102 and substrate 104. Although not illustrated, the edge 105 may be chamfered or exhibit another selected edge geometry. The substrate 104 may be generally cylindrical or another selected configuration, without limitation. Although FIG. 1 shows the interfacial surface 106 as being substantially planar, the interfacial surface 106 may exhibit a selected nonplanar topography, without limitation. The superabrasive table 102 may include a number of bonded superabrasive grains 108 defining interstitial regions, with metal-solvent catalyst 110 disposed within the interstitial regions. Such metal-solvent catalyst 110 may, optionally, be at least partially removed from the superabrasive table 102 subsequent to sintering, such as by leaching with an acid or by another suitable method. The superabrasive grains 108 may comprise diamond grains, cubic boron nitride grains, silicon carbide grains, another superabrasive material, or combinations of the foregoing, without limitation. The metal-solvent catalyst 110 may comprise cobalt, iron, nickel, alloys thereof, or another suitable solvent catalyst. Such catalyst may be swept in from the substrate 104 or may be provided from another source.

The superabrasive grains 108 exhibit a substantially monotonic distribution 112 of grain size in a selected direction T. In the illustrated embodiment, the selected direction T is substantially perpendicular to and measured from the upper surface 103 of the superabrasive table 102 (such direction is labeled as depth on the plot illustrating the substantially monotonic distribution 112). However, in other embodiments of the present invention, the superabrasive grains 108 may exhibit a substantially monotonic grain size distribution in another direction (e.g., a lateral or widthwise) of the superabrasive table 102 as opposed to the selected direction T. The sintered grain size of the superabrasive grains 108 may increase with distance from the upper surface 103 toward the interfacial surface 106. Thus, in the illustrated embodiment, the superabrasive table 102 includes relatively finer, more wear resistant superabrasive grains 108 with a grain size that may be sub-micron or nanometer in size (e.g., about 500 nm to about 0.5 μm) at and proximate the upper surface 103 and edge 105 that, predominately, function as cutting surfaces or bearing surfaces during use and larger superabrasive grains 108 adjacent to or proximate to the substrate 104 with a relatively larger grain size (e.g., about 5 μm to about 100 μm). In other embodiments of the present invention, the superabrasive grains 108 may exhibit a substantially monotonic grain size distribution in which the grain size decreases from the upper surface 103 toward the interfacial surface 106 or in another selected direction that may be tailored for a particular application.

As used herein, a "monotonic distribution," with respect to grain size, is a distribution in which every value for the grain size is larger than the previous one or in which every value for the size is smaller than the previous value. As used herein, the phrase "substantially monotonic distribution of grain size," "substantially monotonic distribution of particle size," "substantially monotonic distribution of concentration," or variants thereof include distributions that may deviate slightly from an ideal monotonic distribution. For example, the grain size of the superabrasive grains 108 may decrease slightly, followed by consistently increasing as shown in substantially monotonic grain size distribution 114a. Other examples of substantially monotonic grain size distributions are shown in substantially monotonic grain size distributions 114b and 114c. Other deviations from an ideal monotonic grain size distribution may occur. Additionally, as used herein, the phrase "substantially monotonic distribution of grain size," "substantially monotonic distribution of particle size," "substantially monotonic distribution of concentration," or variants thereof include distributions in which the grain size/particle size/concentration increases or decreases in a stepwise manner (i.e., a discretized monotonic distribution) or otherwise departs from the illustrated linear monotonic distribution 112.

The substrate 104 may include a metal-solvent catalyst, such as cobalt in a cobalt-cemented tungsten carbide or another suitable material. Other materials that may be used for the substrate 104 include, without limitation, cemented carbides including titanium carbide, niobium carbide, tantalum carbide, vanadium carbide, and combinations of any of the preceding carbides cemented with cobalt, iron, nickel, or alloys thereof. In another embodiment of the present invention, the substrate 104 may comprise a carbide material (e.g., tungsten carbide) that is deposited on the superabrasive table 102, as disclosed in U.S. Patent Application No. 60/850,969, to enable attaching the superabrasive compact 100 to a bit body of a rotary drill bit. U.S. Patent Application No. 60/850,969 is incorporated herein, in its entirety, by this reference.

Figure 2:
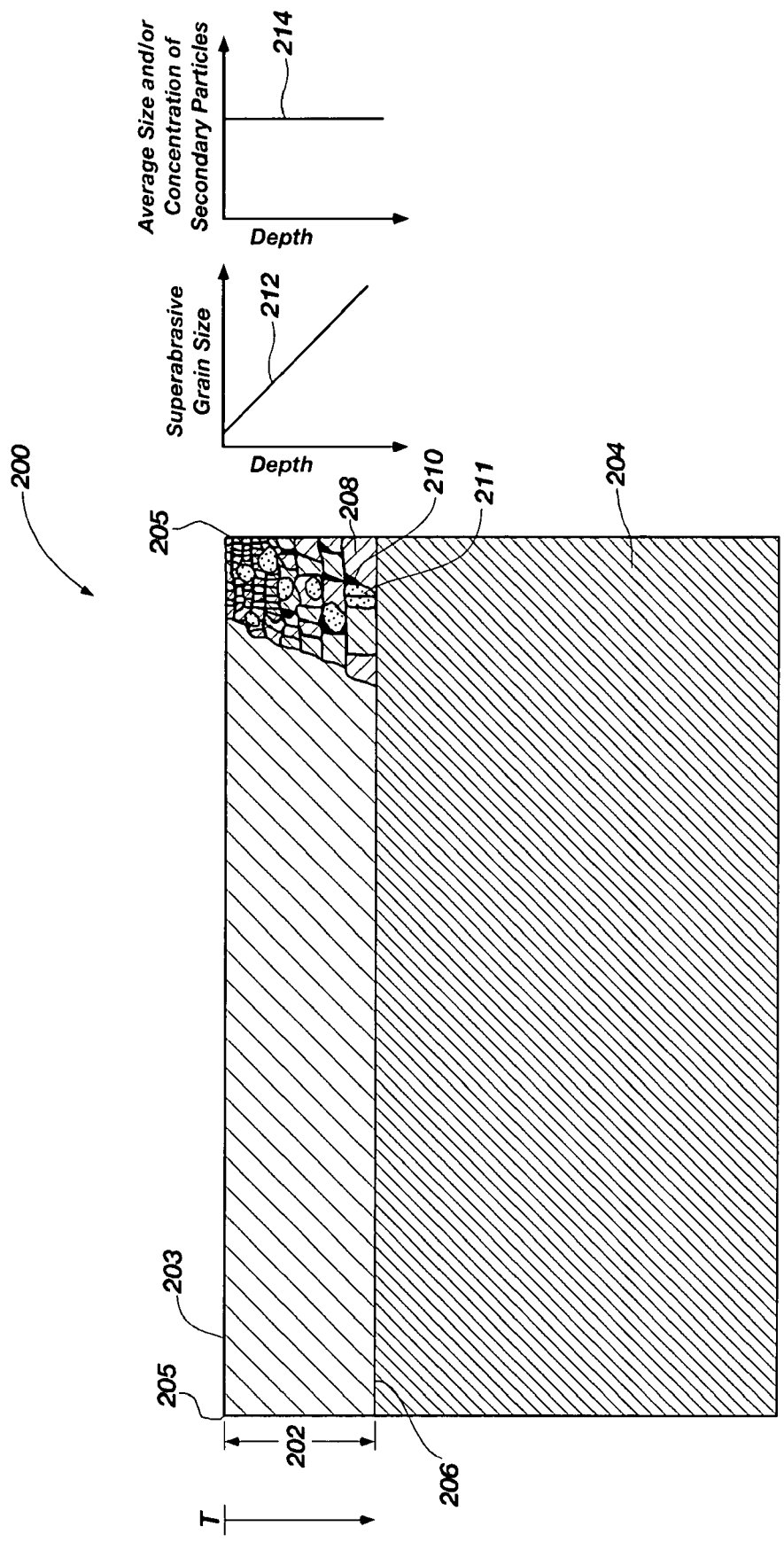
FIG. 2 is a schematic cross-sectional view of a superabrasive compact including a superabrasive table exhibiting a substantially monotonic grain size distribution of superabrasive grains and a substantially constant average particle size and/or concentration distribution of secondary particles in a selected direction according to another embodiment of the present invention.

FIG. 2 is a schematic cross-sectional view of a superabrasive compact 200 according to another embodiment of the present invention. The superabrasive compact 200 comprises a superabrasive table 202 bonded to a substrate 204, with the superabrasive table 202 including an upper surface 203 and an edge 205. The superabrasive compact 200 further includes an interfacial surface 206 formed between the superabrasive table 202 and substrate 204. The substrate 204 may exhibit any of the configurations and compositions previously discussed with respect to the substrate 104 shown in FIG. 1 or may exhibit any known or later developed configurations and compositions. The superabrasive table 202 includes a number of bonded superabrasive grains 208 defining interstitial regions, with metal-solvent catalyst 210 disposed within the interstitial regions. Such metal-solvent catalyst 210 may, optionally, be at least partially removed from the superabrasive table 202 subsequent to sintering, such as by leaching with an acid or by another suitable method. The superabrasive grains 208 may comprise diamond grains, cubic boron nitride grains, silicon carbide grains, another superabrasive material, or combinations of any of the foregoing, without limitation. The metal-solvent catalyst 210 may comprise cobalt, iron, nickel, alloys thereof, or another suitable solvent catalyst. Such catalyst may be swept in from the substrate 204 or may be provided from another source.

The superabrasive table 202 also includes secondary particles 211. The metal-solvent catalyst 210 may also be disposed within interstitial regions formed between adjacent secondary particles 211 and/or between interstitial regions formed between adjacent secondary particles 211 and superabrasive grains 208. According to various embodiments of the present invention, each of the secondary particles 211 may comprise metal-carbide particles or pre-sintered cemented metal-carbide particles. In one embodiment of the present invention, at least a portion of the metal-carbide particles may comprise tungsten carbide (e.g., WC, $W_2C$, or combinations thereof), titanium carbide, titanium carbonitride, niobium carbide, tantalum carbide, vanadium carbide, boron carbide, silicon carbide, and combinations of any of the preceding carbides and carbonitrides. In another embodiment, at least a portion of the secondary particles 211 may comprise pre-sintered metal-carbide particles that include tungsten carbide, titanium carbide, titanium carbonitride, niobium carbide, tantalum carbide, vanadium carbide, and combinations of any of the preceding carbides or carbonitrides cemented with cobalt, iron, nickel, alloys thereof, or another suitable binder. In other embodiments of the present invention, the secondary particles 211 may comprise another non-diamond-based material, such as particles made from a commercially pure refractory metal or a refractory metal alloy.

With continued reference to FIG. 2, the superabrasive grains 208 exhibit a substantially monotonic distribution 212 of grain size in a selected direction T. The substantially monotonic distribution 212 similar to the substantially monotonic grain size distribution 112 or 114a-114c shown in FIG. 1. The substantially monotonic distribution 212 of grain size may increase (as shown) or decrease with distance from the upper surface 203 toward the interfacial surface 206. The secondary particles 211 exhibit a substantially constant distribution 214 of average particle size and/or concentration in the selected direction T. Thus, the average particle size of the secondary particles 211 remains relatively constant with distance from the upper surface 203 toward the substrate 204. Again, as with the superabrasive compact 200, the selected distribution for the superabrasive grains 208 and the secondary particles 211 may be in another selected direction besides a thickness direction, such as a lateral, radial, or widthwise direction.

Figure 3:
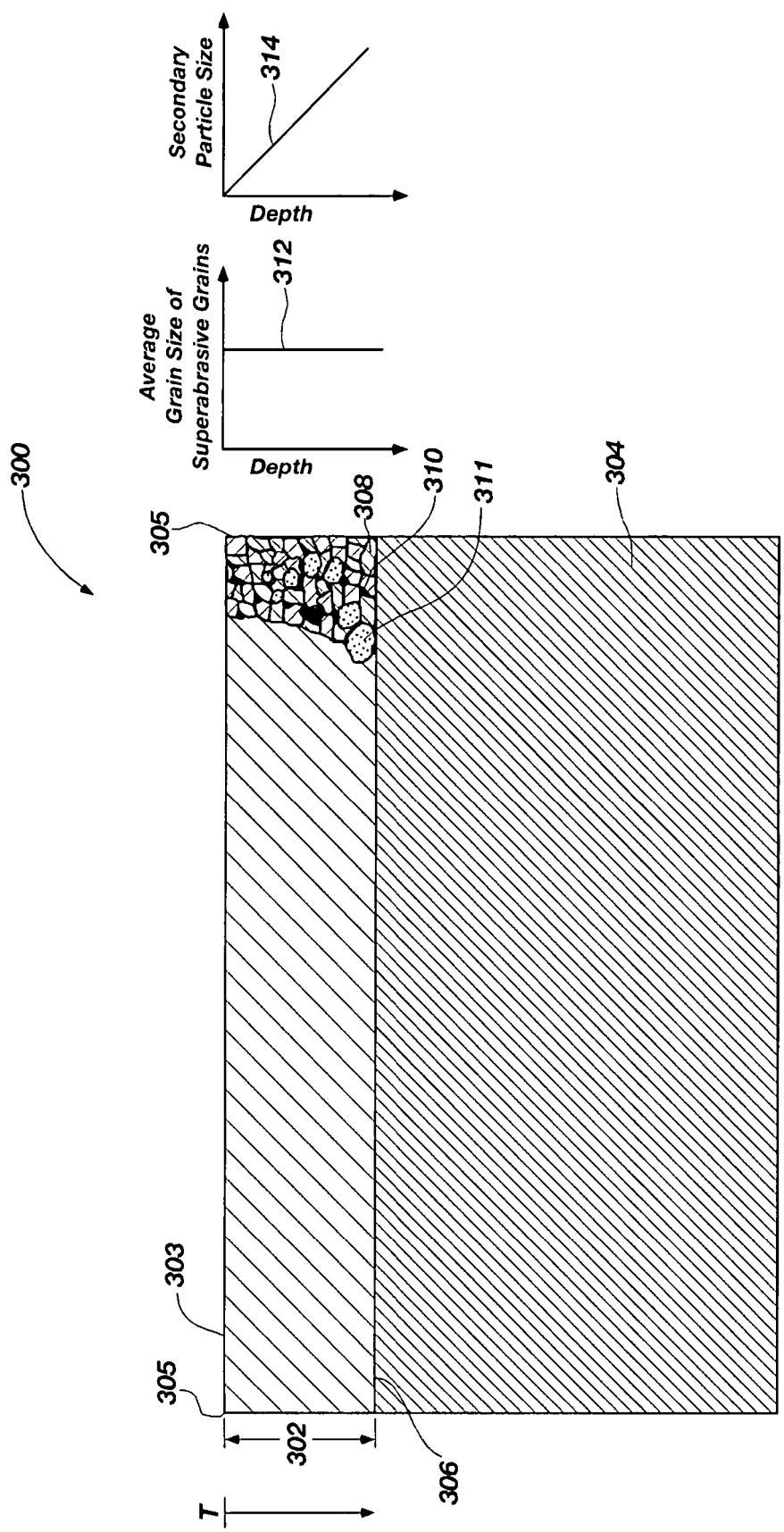
FIG. 3 is a schematic cross-sectional view of a superabrasive compact including a superabrasive table exhibiting a substantially constant average grain size distribution of superabrasive grains and a substantially monotonic particle size distribution of secondary particles in a selected direction according to another embodiment of the present invention.

FIG. 3 is a schematic cross-sectional view of a superabrasive compact 300 according to another embodiment of the present invention. The superabrasive compact 300 comprises a superabrasive table 302 bonded to a substrate 304, with the superabrasive table 302 including an upper surface 303 and an edge 305. The superabrasive compact 300 further includes an interfacial surface 306 formed between the superabrasive table 302 and substrate 304. The substrate 304 may exhibit any of the configurations and compositions previously discussed with respect to the substrate 104 shown in FIG. 1 or may exhibit any known or later developed configurations and compositions. The superabrasive table 302 includes a number of bonded superabrasive grains 308 defining interstitial regions, with metal-solvent catalyst 310 disposed within the interstitial regions. Such metal-solvent catalyst 310 may, optionally, be at least partially removed from the superabrasive table 202 subsequent to sintering, such as by leaching with an acid or by another suitable method. The superabrasive grains 308 may comprise diamond grains, cubic boron nitride grains, silicon carbide grains, another superabrasive material, or combinations of any of the foregoing, without limitation. The metal-solvent catalyst 310 may comprise cobalt, iron, nickel, alloys thereof, or another suitable solvent catalyst. Such catalyst may be swept in from the substrate 304 or may be provided from another source.

The superabrasive table 302 also includes secondary particles 311. The metal-solvent catalyst 310 may also be disposed within interstitial regions formed between adjacent secondary particles 311 and/or between interstitial regions formed between adjacent secondary particles 311 and superabrasive grains 308. The secondary particles 311 may be comprised of any of the previously described materials described above with respect to the secondary particles 211. The superabrasive grains 308 exhibit a substantially constant distribution 312 of average grain size in a selected direction T. Thus, the average grain size of the superabrasive grains 308 remains relatively constant with distance from the upper surface 303 toward the substrate 304, with the superabrasive grains 308 being generally uniformly distributed throughout the superabrasive table 302. However, in other embodiments of the present invention, the superabrasive grains 308 may exhibit a selected grain size distribution (e.g., a uni-modal, bi-modal, multi-modal, etc.), while still being generally uniformly distributed throughout the superabrasive table 302. The secondary particles 311 exhibit a substantially monotonic distribution of particle size shown as distribution 314 (or a variant thereof) in the selected direction T, while the concentration of the secondary particles 311 may remain relatively constant with distance from the upper surface 303. Although the substantially monotonic distribution of particle size for the secondary particles 311 is illustrated in the selected direction T, the distribution may be in another selected direction, such as a lateral, radial, or widthwise direction.

Figure 4:
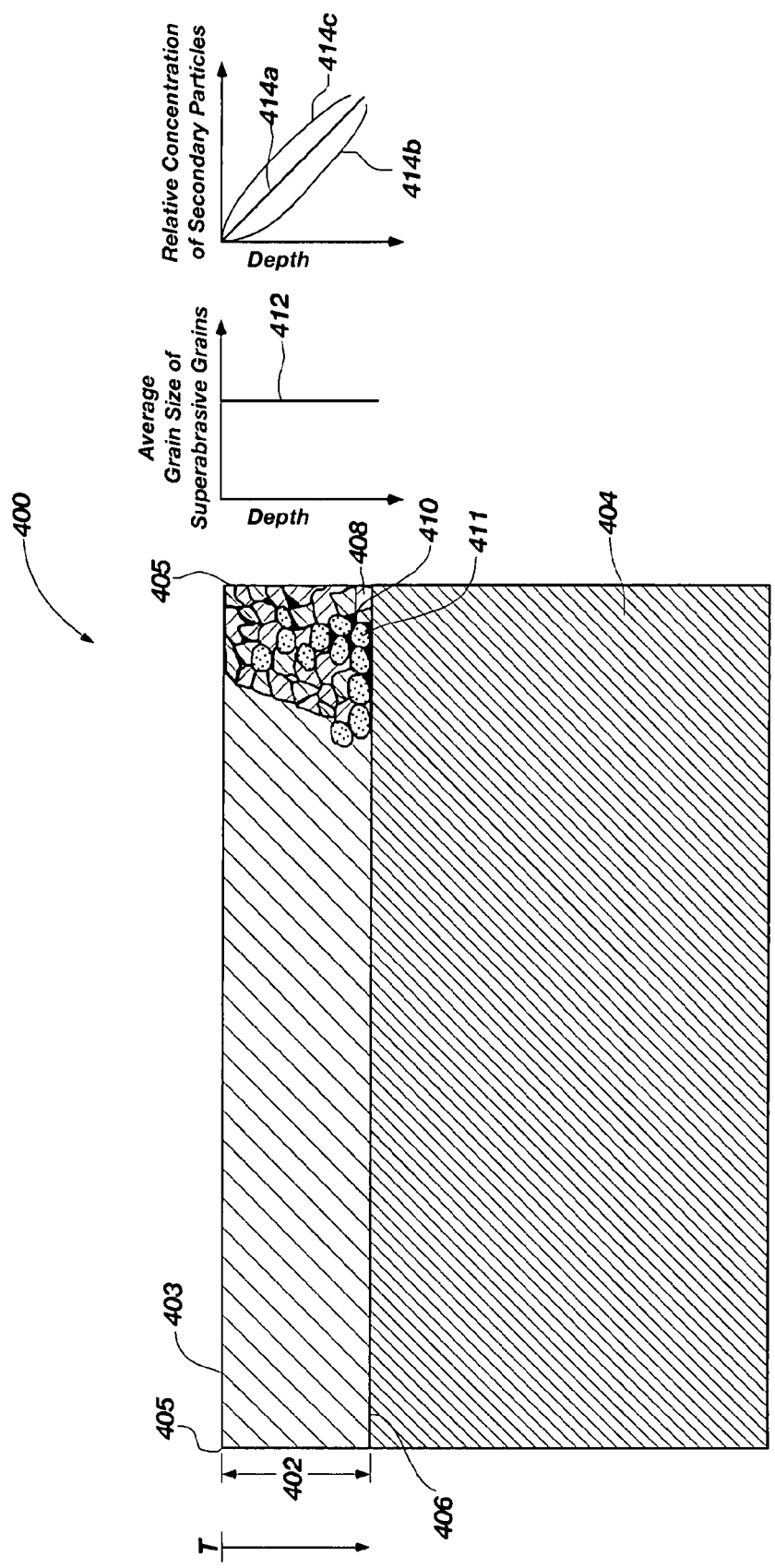
FIG. 4 is a schematic cross-sectional view of a superabrasive compact including a superabrasive table exhibiting a substantially constant average grain size distribution of superabrasive grains and a substantially monotonic concentration distribution of secondary particles in a selected direction according to another embodiment of the present invention.

FIG. 4 is a schematic cross-sectional view of a superabrasive compact 400 according to another embodiment of the present invention. The superabrasive compact 400 comprises a superabrasive table 402 bonded to a substrate 404, with the superabrasive table 402 including an upper surface 403 and an edge 405. The superabrasive compact 400 further includes an interfacial surface 406 formed between the superabrasive table 402 and substrate 404. The substrate 404 may exhibit any of the configurations and compositions previously discussed with respect to the substrate 104 shown in FIG. 1 or may exhibit any known or later developed configurations and compositions. The superabrasive table 402 includes a number of bonded superabrasive grains 408 defining interstitial regions, with metal-solvent catalyst 410 disposed within the interstitial regions. The metal-solvent catalyst 410 may comprise any of the previously described metal-solvent catalysts. The superabrasive grains 408 may comprise diamond grains, cubic boron nitride grains, silicon carbide grains, another superabrasive material, or combinations of any of the foregoing, without limitation. The superabrasive table 402 also includes secondary particles 411 comprised of any of the previously described materials described above with respect to the secondary particles 211. The metal-solvent catalyst 410 may also be disposed within interstitial regions formed between adjacent secondary particles 411 and/or between interstitial regions formed between adjacent secondary particles 411 and superabrasive grains 408.

With continued reference to FIG. 4, the superabrasive grains 408 may exhibit a substantially constant distribution 412 of average grain size in a selected direction T. Thus, the average grain size of the superabrasive grains 408 remains relatively constant with increasing distance from the upper surface 403 toward the substrate 404. The secondary particles 411 may exhibit a substantially monotonic distribution of concentration (e.g., one of distributions 414a-414c) in a selected direction T, while the average particle size of the secondary particles 411 may remain relatively constant with distance from the upper surface 403. The concentration of the secondary particles 411 may be measured by volume or weight percentage of the superabrasive table 402. In the illustrated embodiment, the concentration of the secondary particles 411 increases with increasing distance from the upper surface 403 of the superabrasive table 402. In such an embodiment, the region of the superabrasive table 402 at and proximate to the upper surface 403 and the edge 405 may be generally free of the secondary particles 411 to provide a more wear resistant surface for cutting or bearing applications, and the relative concentration of the superabrasive grains 408 immediately adjacent to the substrate 404 may be negligible. In certain embodiments of the present invention, each of the secondary particles 411 may comprise a metal carbide particle or a cemented metal carbide particle that exhibits a coefficient of thermal expansion ("CTE") that closely matches that of the substrate 404 or is between a CTE of the superabrasive grains 408 and the substrate 404. In such a configuration, the thermal stresses experienced by the superabrasive table 402 during HPHT processing and use (e.g., drilling) may be moderated to help prevent delamination of the superabrasive table 402 from the substrate 404.

Figure 5:
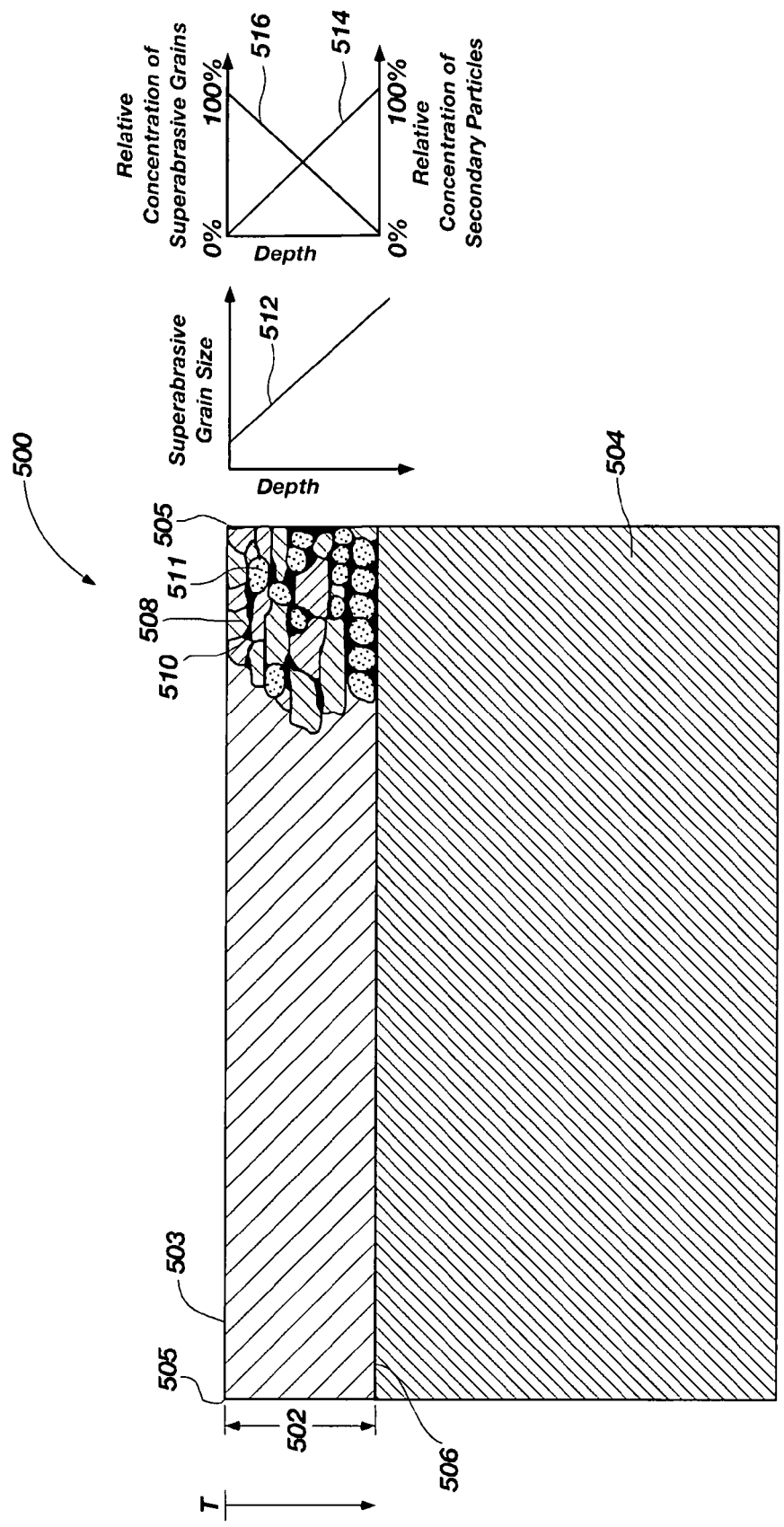
FIG. 5 is a schematic cross-sectional view of a superabrasive compact including a superabrasive table exhibiting a substantially monotonic grain size distribution of superabrasive grains and a substantially monotonic concentration distribution of secondary particles and superabrasive grains in a selected direction according to another embodiment of the present invention.

FIG. 5 is a schematic cross-sectional view of a superabrasive compact 500 according to yet another embodiment of the present invention. The superabrasive compact 500 comprises a superabrasive table 502 bonded to a substrate 504, with the superabrasive table 502 including an upper surface 503 and an edge 505. The superabrasive compact 500 further includes an interfacial surface 506 formed between the superabrasive table 502 and substrate 504. The substrate 504 may exhibit any of the configurations and compositions previously discussed with respect to the substrate 104 shown in FIG. 1 or may exhibit any known or later developed configurations and compositions. The superabrasive abrasive table 502 includes a number of bonded superabrasive grains 508 defining interstitial regions, with metal-solvent catalyst 510 disposed within the interstitial regions. The metal-solvent catalyst 510 comprises with any of the previously described metal-solvent catalysts. The superabrasive grains 508 may comprise diamond grains, cubic boron nitride grains, silicon carbide grains, another superabrasive material, or combinations of any of the foregoing, without limitation. The superabrasive table 502 also includes secondary particles 511 comprised of any of the previously described materials with respect to the secondary particles 211. The metal-solvent catalyst 510 may also be disposed within interstitial regions formed between adjacent secondary particles 511 and/or between interstitial regions formed between adjacent secondary particles 511 and superabrasive grains 508.

With continued reference to FIG. 5, the superabrasive grains 508 exhibit a substantially monotonic distribution 512 of grain size in a selected direction T similar to the distribution 112 or 114a-114c shown in FIG. 1. In the illustrated embodiment shown in FIG. 5, the secondary particles 511 also exhibit a substantially monotonic distribution of concentration (shown as distribution 514 or a variant thereof) in the selected direction T, while the average particle size of the secondary particles 511 may remain relatively constant as a function of increasing distance from the upper surface 503. The concentration of the secondary particles 511 may be measured by volume or weight percentage of the superabrasive table 502. The relative concentration of the secondary particles may increase with increasing distance from the upper surface 503 toward the substrate 504. The superabrasive grains 508 also exhibit a substantially monotonic distribution in concentration in the selected direction T shown as distribution 516 or a variant thereof. Thus, in a manner similar to the manner previously described with respect to the superabrasive compact 400, each of the secondary particles 511 may comprise a material (e.g., a metal carbide particle or a cemented metal carbide particle) with a CTE that closely matches that of the substrate 504 or a CTE having a value intermediate between that of the substrate 504 and the superabrasive grains 508, which may help moderate thermal stresses. Additionally, as shown in FIG. 5, the concentration of the superabrasive grains 508 also decreases with distance from the upper surface 503 toward the substrate 504. Accordingly, in certain embodiments of the present invention, the relative concentration of the superabrasive grains 508 may be approximately one-hundred percent by volume at and proximate the upper surface 503 and the edge 505 to provide more wear resistant cutting or bearing surfaces.

Figure 6A:
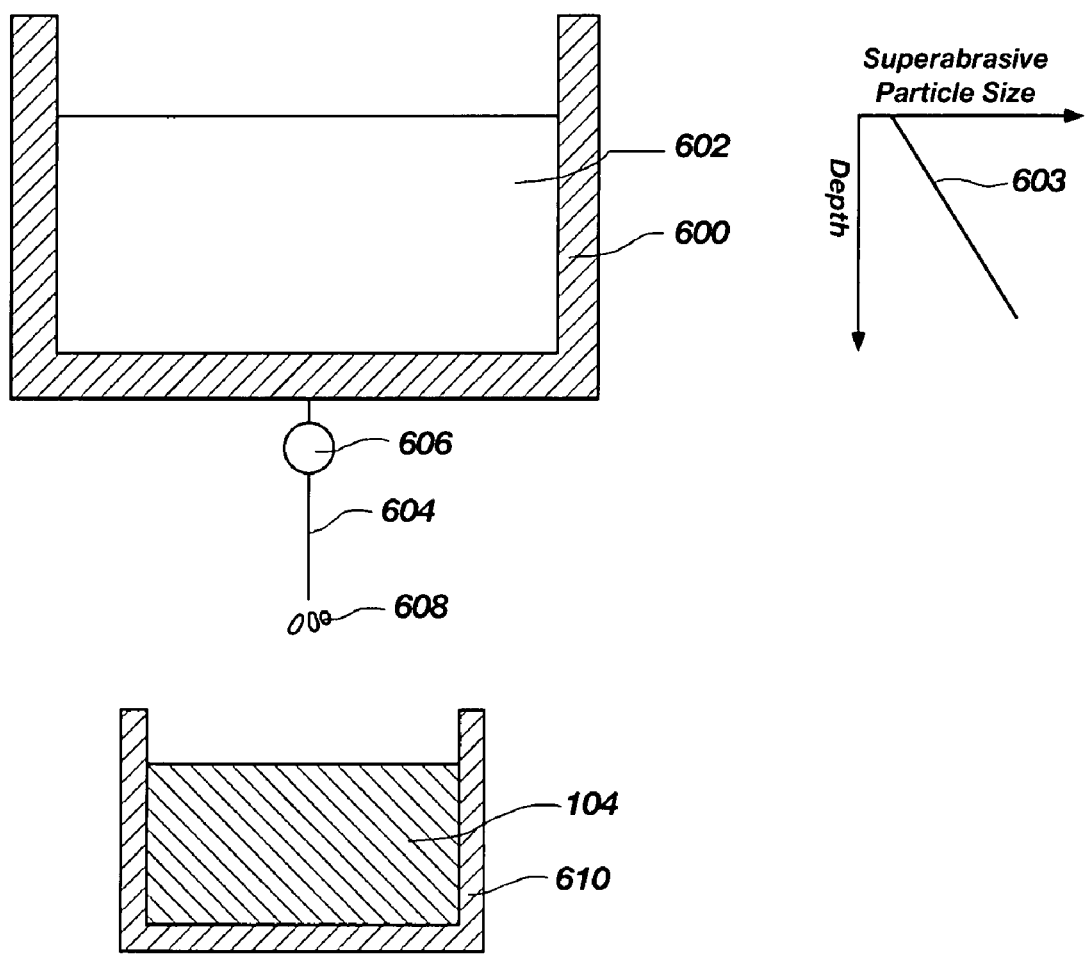
FIGS. 6A-6C are schematic side cross-sectional views that illustrate various stages in a method of forming a superabrasive compact including a superabrasive table exhibiting a substantially monotonic superabrasive grain size distribution in a selected direction according to one embodiment of the present invention.
Figure 6B:
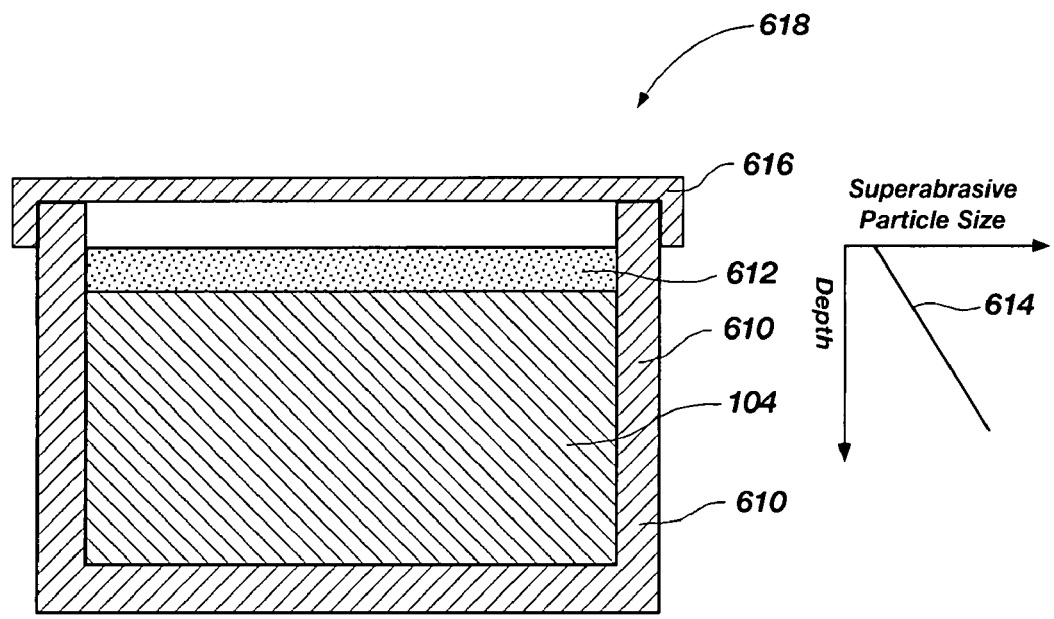
Figure 6C:
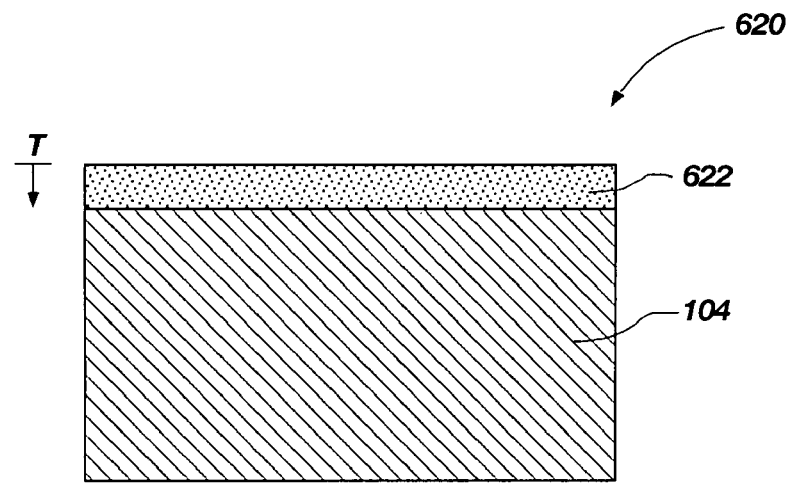

The superabrasive compacts 100, 200, 300, 400, and 500 shown in FIGS. 1-5 may be fabricated according to various embodiments of the present invention. FIGS. 6A-6C shows one embodiment according to the present invention for fabricating the superabrasive compact 100 shown in FIG. 1. FIG. 6A shows a schematic cross-sectional view of reservoir 600 holding a liquid suspension of superabrasive particles 602 (e.g., diamond particles, cubic boron nitride particles, another superabrasive material, or mixtures thereof) that may exhibit a selected size distribution (e.g., a uni-modal, bi-modal, multi-modal, or other selected size distribution of superabrasive particles comprising sizes between about 0.5 μm to about 150 μm). The liquid suspension may further include a deflocculant to help prevent agglomeration of the superabrasive particles 602. Suitable deflocculants may include, but are not limited to, polyacrylate-based deflocculants. Many different polyacrylate-based deflocculants are commercially available from Ciba Specialty Chemicals Inc. of Basel, Switzerland. The liquid suspension 602 may be allowed to settle so that the superabrasive abrasive particles thereof exhibit a substantially monotonic distribution of particle size 603, with the largest superabrasive particles located at the bottom of the reservoir 600. The liquid suspension 602 of superabrasive particles 602 may be formed from superabrasive particles with a uni-modal, bi-modal, multi-modal, or other selected distribution of particle sizes. A fluid line 604 is in fluid communication with and operably coupled to the reservoir 600 via a pump 606. Accordingly, the pump 606 is operable to pump the liquid suspension 602 out of the fluid line 604, which is shown as droplets 608. The droplets 608 may be dispensed onto a substrate 104 received within a container 610. For example, the container 610 may be a refractory metal container. Because the liquid suspension 602 is dispensed from the bottom of the reservoir 600, the superabrasive particles may be dispensed progressively from largest size to smallest size. In another embodiment of the present invention, a nebulizer (not shown) may be coupled to the fluid line 604 that is operable to spray the liquid suspension onto the substrate 104.

As shown in FIG. 6B, a volume of liquid suspension 612 is dispensed onto the substrate 104 and comprises superabrasive particles exhibiting a substantially monotonic distribution of particle size 614, with the largest superabrasive particles located immediately adjacent to the substrate 104. A container lid 616 may receive the container 610, including the substrate 104 and the volume of liquid suspension 612, and sealed thereto by laser welding, brazing, or another suitable technique to form a container assembly 618. In certain embodiments of the present invention, the liquid of the volume of liquid suspension 612 may be evaporated prior to sealing the container assembly 618 so that only the superabrasive particles remain on the substrate 104. Methods and apparatuses for sealing enclosures suitable for holding the particulate mixture are disclosed in U.S. patent application Ser. No. 11/545,929, which is incorporated herein, in its entirety, by this reference.

The container assembly 618 is subjected to a HPHT process to sinter the superabrasive particles together and form a superabrasive compact 620 shown in FIG. 6C. The container assembly 618, including the volume 612 and the substrate 104, is subjected to a HPHT process using an ultra-high pressure press at a temperature of at least about 1000° Celsius (e.g., about 1100° Celsius to about 2200° Celsius) and a pressure of at least about 40 kilobar (e.g., about 50 kilobar to about 80 kilobar) for a time sufficient to sinter the superabrasive particles and form the superabrasive table 622 attached to the substrate 104. The superabrasive compact 620 includes the substrate 104 and a superabrasive table 622 attached to the substrate 104. The superabrasive table 622 exhibits a substantially monotonic distribution of grain size in a thickness direction T similar to the distribution 112 or 114a-114c shown in FIG. 1.

Figure 7A:
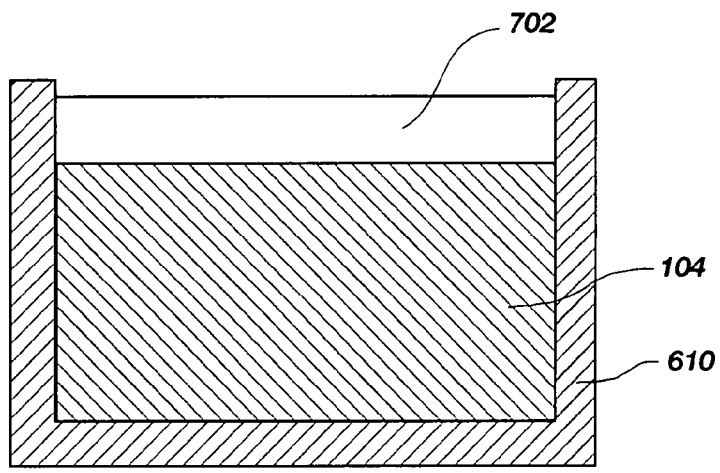
FIGS. 7A-7C are schematic side cross-sectional views that illustrate various stages in a method of forming a superabrasive compact including a superabrasive table exhibiting a substantially monotonic superabrasive grain size distribution in a selected direction according to another embodiment of the present invention.
Figure 7B:
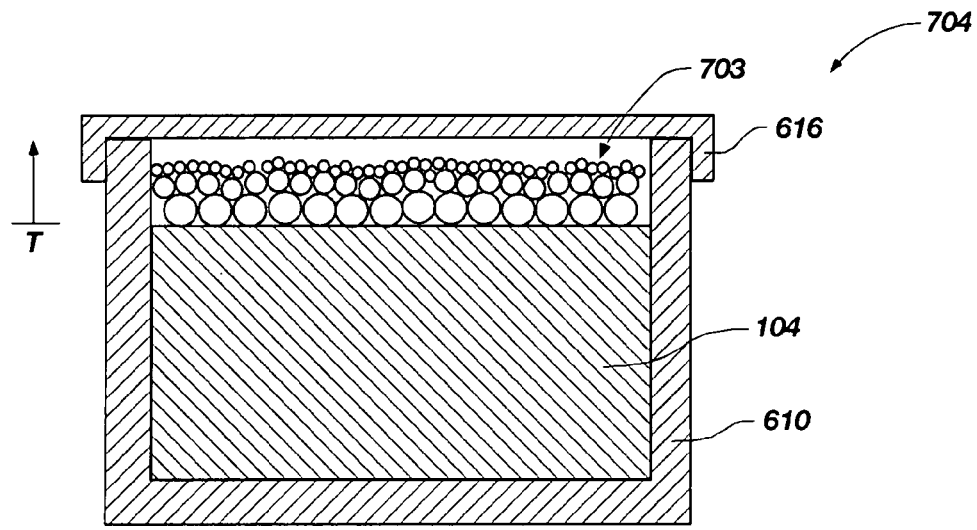
Figure 7C:
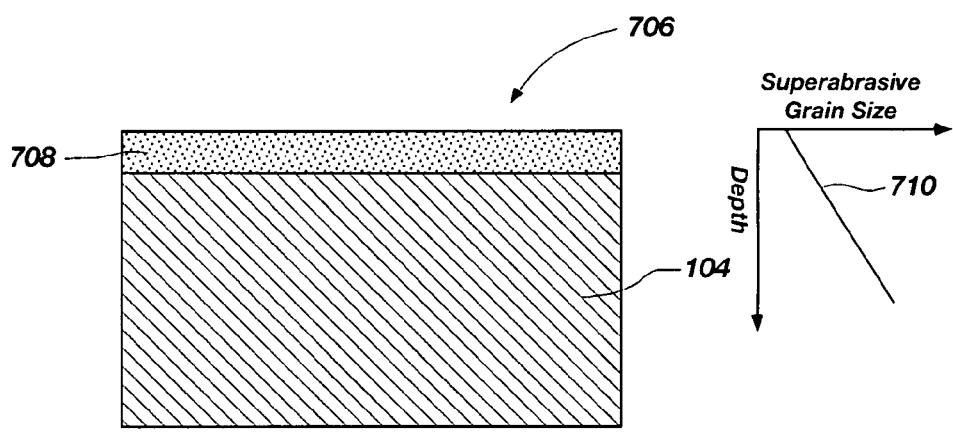

FIGS. 7A-7C illustrates another embodiment according to the present invention for fabricating the superabrasive compact 100 shown in FIG. 1. As shown in FIG. 7A, a volume of liquid suspension 702 comprising generally uniformly distributed superabrasive particles (e.g., diamond particles, cubic boron nitride particles, etc.) is dispensed onto a substrate 104 received within a container 610. The liquid suspension 702 may further include any of the aforementioned deflocculants to help prevent agglomeration of the superabrasive particles. Unlike the volume of liquid suspension 612 shown in FIG. 6B, the superabrasive particles are generally uniformly distributed therein. The superabrasive particles of the volume of liquid suspension 612 are allowed to settle so that the largest superabrasive particles are located immediately adjacent to the substrate 104, with the size of the superabrasive particles deceasing with distance from the substrate 104. Thus, as shown in FIG. 7B, upon settling, the superabrasive particles exhibit a substantially monotonic distribution of particle size in a thickness direction T in which the particle size of the superabrasive particles (shown schematically as superabrasive particles 703) decreases substantially monotonically away from the substrate 104. In another embodiment of the present invention, the assembly of the container 610, substrate 104, and volume of liquid suspension 702 may be rotated in a centrifuge to effect redistributing the superabrasive particles 703 of the liquid suspension 702 so that they exhibit a substantially monotonic distribution of particle size in the thickness direction T in which the particle size of the superabrasive particles 703 decreases substantially monotonically away from the substrate 104.

As shown in FIG. 7B, a container lid 616 may be sealed with the container 610, as previously described, to form a container assembly 704. In certain embodiments of the present invention, the liquid of the volume of liquid suspension 702 may be evaporated so that only the superabrasive particles remain disposed on the substrate 104. The container assembly 704 is subjected to a HPHT process, as previously described, to sinter the superabrasive particles 703 and form a superabrasive compact 706 shown in FIG. 7C. The superabrasive compact 706 includes a superabrasive table 708 attached to the substrate 104. The superabrasive table 708 comprises superabrasive grains (not shown) exhibiting a substantially monotonic distribution of grain size 710, which may embody the distribution 112 or 114a-114c shown in FIG. 1.

In another embodiment of the present invention, a volume of superabrasive particles may be applied, for example, to the substrate 104 received within the container 610. In such an embodiment, the superabrasive particles may be a uni-modal, bi-modal, multi-modal, or any other selected distribution of particle sizes, without limitation. The container 610, including the superabrasive particles and the substrate 104, may be ultrasonically vibrated for a sufficient time so that the superabrasive particles redistribute to exhibit a substantially monotonic distribution of particle size, followed by subjecting the container 610 to HPHT sintering.

Figure 8A:
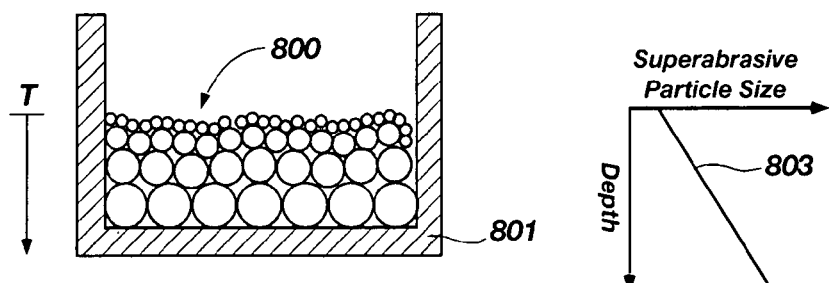
FIGS. 8A-8E are schematic side cross-sectional views that illustrate various stages in a method of forming a superabrasive compact including a superabrasive table exhibiting a substantially monotonic superabrasive grain size distribution in a selected direction according to yet another embodiment of the present invention.
Figure 8B:
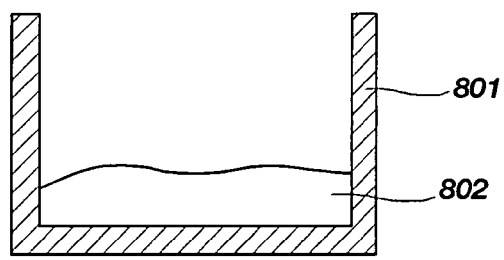
Figure 8C:
Figure 8D:
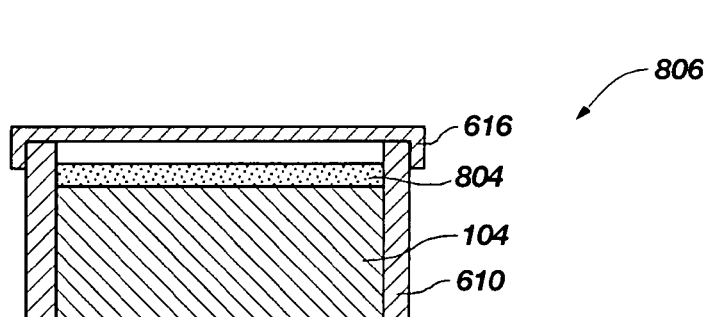
Figure 8E:
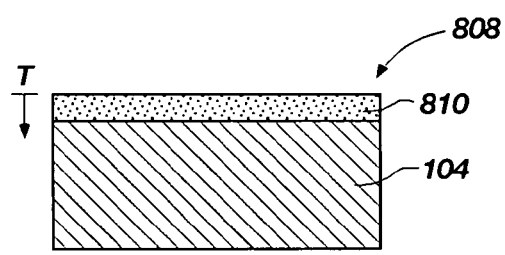

FIGS. 8A-8E shows yet another embodiment according to the present invention for fabricating the superabrasive compact 100 shown in FIG. 1. As shown in FIG. 8A, a volume 800 of superabrasive particles dispersed in a binding medium, such as liquid wax or other binding mediums commonly used for compacting and handling metal and ceramic powders, is dispensed within a container 801. The superabrasive particles are allowed to settle so that the superabrasive particles exhibit a substantially monotonic distribution 803 of particle size in a thickness direction T. The substantially monotonic distribution 803 may embody any previously-described distribution or any distribution within the scope of the present disclosure, without limitation. As shown in FIG. 8B, the volume 800 is allowed to cool so that it at least partially solidifies (cures in the case of liquid wax) to form a self-supporting body 802. As shown in FIG. 8C, the self-supporting body 802 may be selectively shaped to form a precursor body 804. For example, the shape of the precursor body 804 may be defined using stamping, machining, or another suitable shaping process. As shown in FIG. 8D, the precursor body 804 is positioned adjacent to a substrate 104, and both the precursor body 804 and the substrate 104 are placed within a container 610. A container lid 616 is sealed with the container 610 to form an assembly 806, as previously described. The assembly 806, including the precursor body 804 and the substrate 104, is subjected to a HPHT process to evaporate or otherwise remove the binding medium of the precursor body 804 and sinter the superabrasive particles together. As shown FIG. 8E, the HPHT processes forms a superabrasive compact 808 including a superabrasive table 810 attached to the substrate 104 similar in construction to the superabrasive compact 100 shown in FIG. 1. Superabrasive grains of the superabrasive table 810 also exhibit a substantially monotonic distribution of grain size in a thickness direction T, as previously discussed. In the embodiment shown in FIGS. 8A-8D, the substantially monotonic distribution of grain size may be in a direction other than the thickness direction T by appropriately cutting the precursor body 804 from the body 802.

Figure 9A:
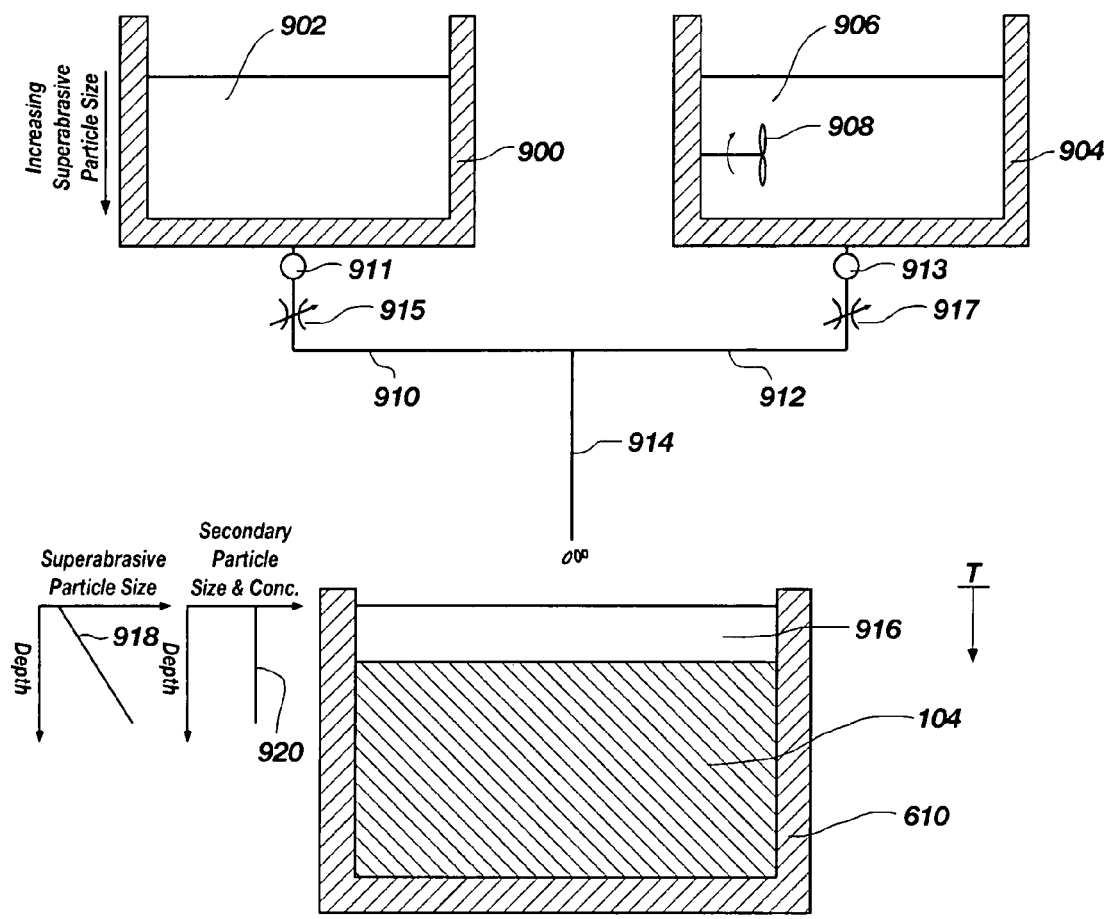
FIGS. 9A-9D schematically illustrate methods of forming the superabrasive compacts shown in FIGS. 2-5 according to various embodiments of the present invention.

FIG. 9A shows an embodiment of a method according to the present invention for fabricating the superabrasive compact 200 shown in FIG. 2. As shown in FIG. 9A, a first reservoir 900 holds a liquid suspension 902 of superabrasive particles (e.g., diamond particles, cubic boron nitride particles, other superabrasive particles, or mixtures thereof). The liquid suspension 902 may further include any of the aforementioned deflocculants to help prevent agglomeration of the superabrasive particles. As previously described, the superabrasive particles of the liquid suspension 902 have been allowed to settle so that they exhibit a substantially monotonic distribution of particle size, with the largest superabrasive particles located at the bottom of the first reservoir 900. A second reservoir 904 is also provided that holds a liquid suspension 906 of secondary particles (e.g., metal-carbide particles or cemented carbide particles). The liquid suspension 906 may further include any of the aforementioned deflocculants. An agitator 908, such as a propeller, may be coupled to the second reservoir 904 to agitate the liquid suspension 906 to ensure that the secondary particles are generally uniformly distributed. A first fluid line 910 is in fluid communication with the first reservoir 900 and a pump 911 is operable to pump the liquid suspension 902 through the first fluid line 910. A first valve 915 may control the flow rate of the liquid suspension 902 through the first fluid line 910. A second fluid line 912 is in fluid communication with the second reservoir 904 and a pump 913 is operable to pump the liquid suspension 906 through the second fluid line 912. A second valve 917 may control the flow rate of the liquid suspension 906 through the second fluid line 912. A mixing line 914 is in fluid communication with the first fluid line 910 and the second fluid line 912.

During use, the pump 911 pumps the liquid suspension 902 through the first fluid line 910 and the pump 913 pumps the liquid suspension 906 through the second fluid line 912. The liquid suspension 902 and 906 are mixed in the mixing line 914. The liquid suspension is dispensed from the mixing line 914 onto a substrate 104 received within a container 610. The act of dispensing forms a volume of liquid suspension 916 on the substrate 104. The volume of liquid suspension 916 exhibits a substantially monotonic distribution of superabrasive particles 918 (the illustrated substantially monotonic distribution of superabrasive particles 918 shown merely as an example) and a substantially constant distribution 920 of average size and concentration for the secondary particles in a thickness direction T. After forming the volume of liquid suspension 916, a container lid (not shown) may be sealed with the container 610 to form an assembly. The assembly, including the substrate 104 and the volume of liquid suspension 916, is subjected to a HPHT process to form a superabrasive compact similar in construction to the superabrasive compact 200 shown in FIG. 2.

Figure 9B:
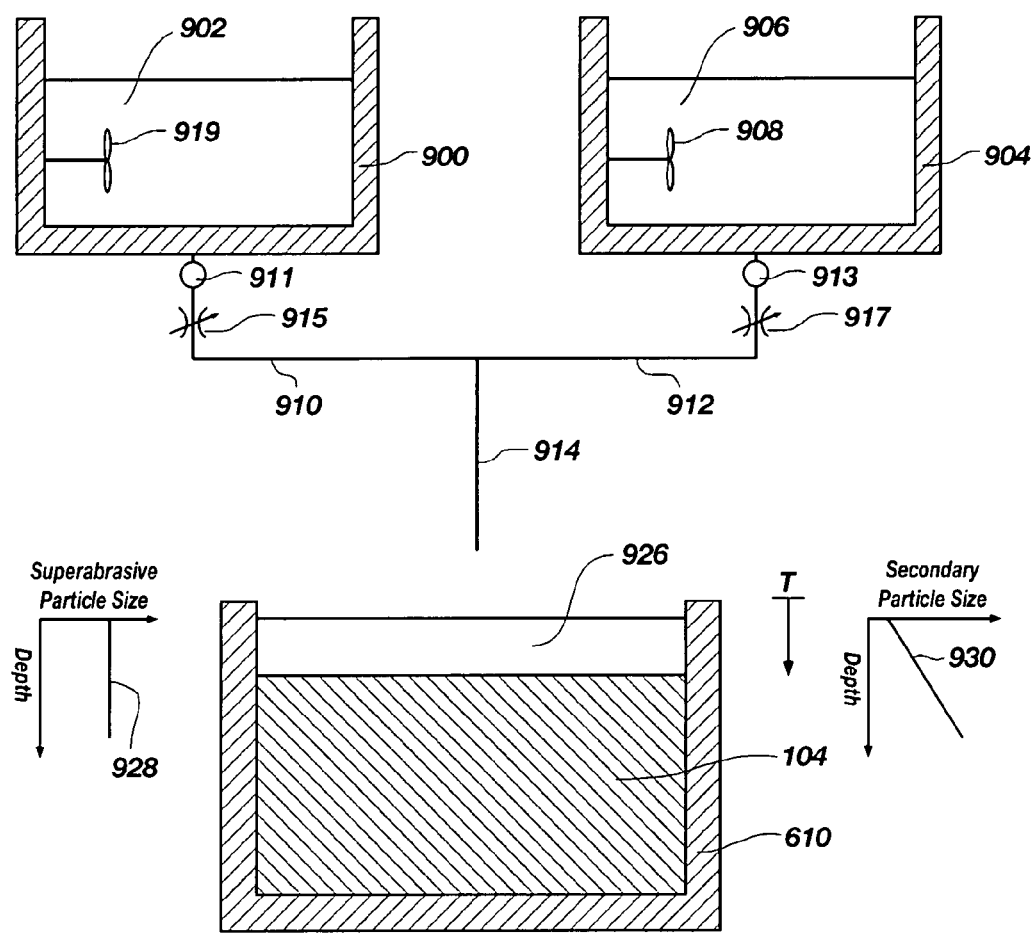

With reference to FIG. 9B, a superabrasive compact similar in construction to the superabrasive compact 300 shown in FIG. 3 may be formed by agitating the liquid suspension 902 so that the superabrasive particles are generally uniformly distributed and allowing the secondary particles of the liquid suspension 906 to settle to distribute the secondary particles with a substantially monotonic particle size distribution. For example, an agitator 919 may be coupled to the interior of the first reservoir 900 to agitate the liquid suspension 902. A volume of liquid 926 may be dispensed onto the substrate 104 in which the superabrasive particles exhibit a substantially constant distribution 928 of average particle size and the secondary particles exhibit a substantially monotonic distribution 930 of particle size in a thickness direction T. The particle size of the secondary particles decreases with increasing distance from the substrate 104. If desired, the liquid of the volume of liquid 926 may be removed by evaporation or another technique prior to subjecting the substrate 104 and the superabrasive and secondary particles dispensed thereon to a HPHT process to form a superabrasive compact.

Figure 9C:
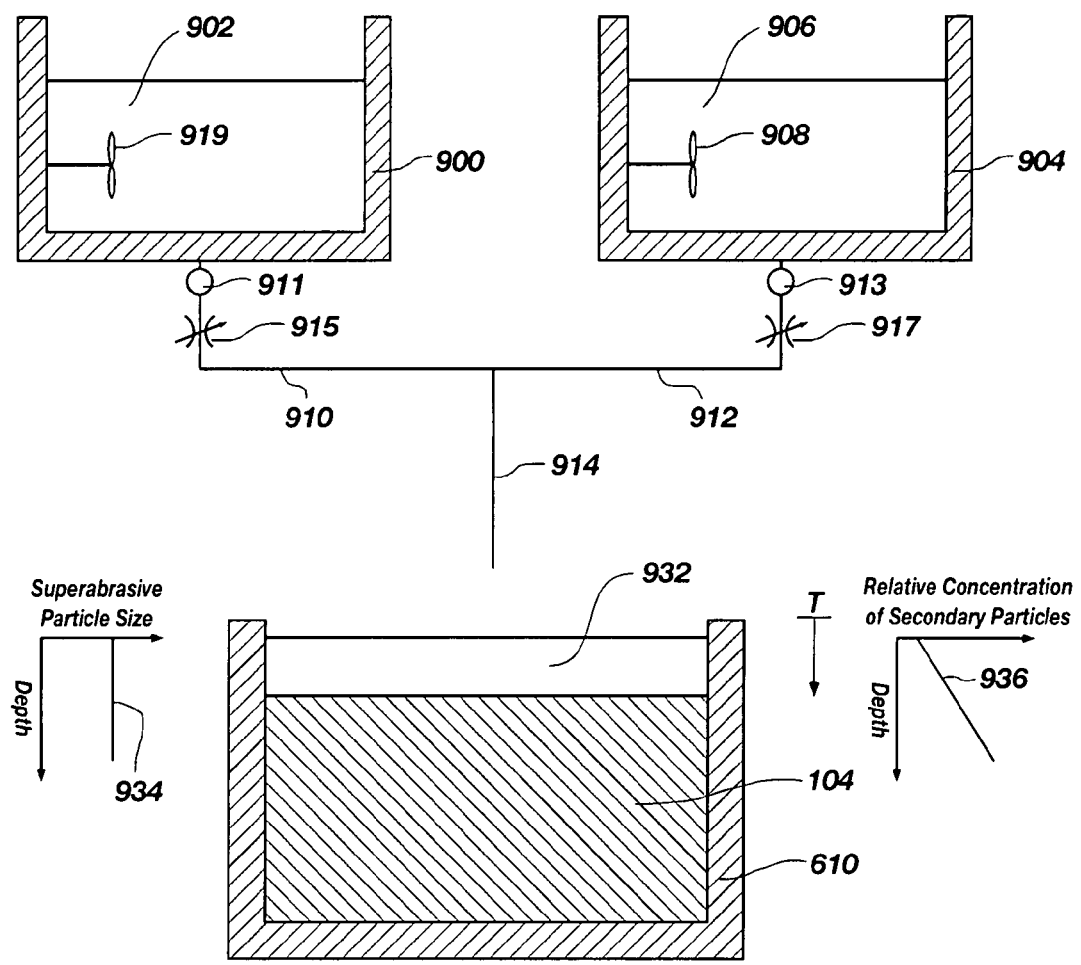

Referring to FIG. 9C, a superabrasive compact similar in construction to the superabrasive compact 400 shown in FIG. 4 may be formed by agitating the liquid suspension 902 so that the superabrasive particles are generally uniformly distributed in addition to agitating the liquid suspension 906. The secondary particles of the liquid suspension 906 may agitated using the agitator 908 to uniformly distribute the secondary particles within the liquid suspension 906. For example, the agitator 919 may be coupled to the first reservoir 900 to agitate the liquid suspension 902. The valve 917 may be used to control the concentration of the liquid suspension 906 introduced to the mixing line 914 relative to the concentration of liquid suspension 902 introduced to the mixing line 914 from the first fluid line 910. A volume of liquid suspension 932 may be dispensed onto the substrate 104 from the mixing line 914 or otherwise dispersed or applied such that the liquid suspension 932 exhibits a substantially constant distribution 934 of average grain size and a substantially monotonic concentration distribution 936 of secondary particles in a thickness direction T. The concentration of the secondary particles decreases with increasing distance from the substrate 104. Further, the substrate 104, and the superabrasive particles and secondary particles dispensed thereon may be exposed to a HPHT process (after removing the liquid) to form a superabrasive compact with a superabrasive table similar in construction to the superabrasive compact 400 shown in FIG. 4.

Figure 9D:
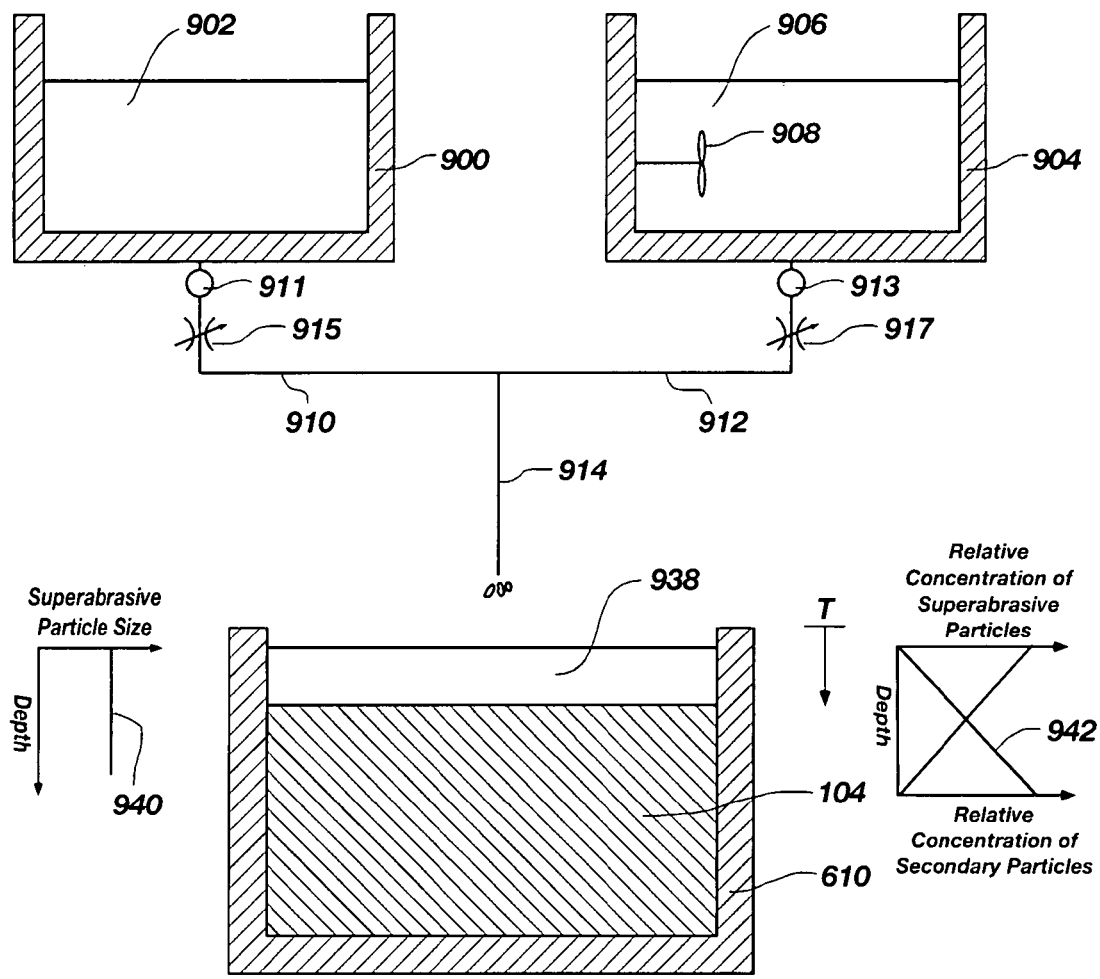

With reference to FIG. 9D, in yet another embodiment of present invention, a superabrasive compact similar in construction to the superabrasive compact 500 shown in FIG. 5. The liquid suspension 902 is not agitated so that the superabrasive particles thereof are allowed to settle and form a substantially monotonic particle size distribution, with the largest superabrasive particles located at the bottom of the first reservoir 900. The liquid suspension 906 is agitated using the agitator 908 to uniformly distribute the second particles therethrough. The valve 917 may be used to control the concentration of the liquid suspension 906 introduced to the mixing line 914 relative to the concentration of liquid suspension 902 introduced to the mixing line 914 from the first fluid line 910. A volume of liquid suspension 938 may be dispensed onto the substrate 104 from the mixing line 914 or otherwise dispersed or applied such that the liquid suspension 932 exhibits a substantially monotonic distribution 940 of superabrasive particle size and a substantially monotonic concentration distribution 942 of secondary particles in a thickness direction T. The concentration of the secondary particles decreases with increasing distance from the substrate 104. Further, the substrate 104, and the superabrasive particles and secondary particles dispensed thereon may be exposed to a HPHT process (after removing the liquid) to form a superabrasive compact with a superabrasive table similar in construction to the superabrasive compact 400 shown in FIG. 4.

In any of the above-described embodiments, the superabrasive table may be separately formed and subsequently attached to a substrate. For example, the superabrasive table may be attached to a substrate using a second HPHT process, a brazing process, or another suitable joining process.

Figure 10A:
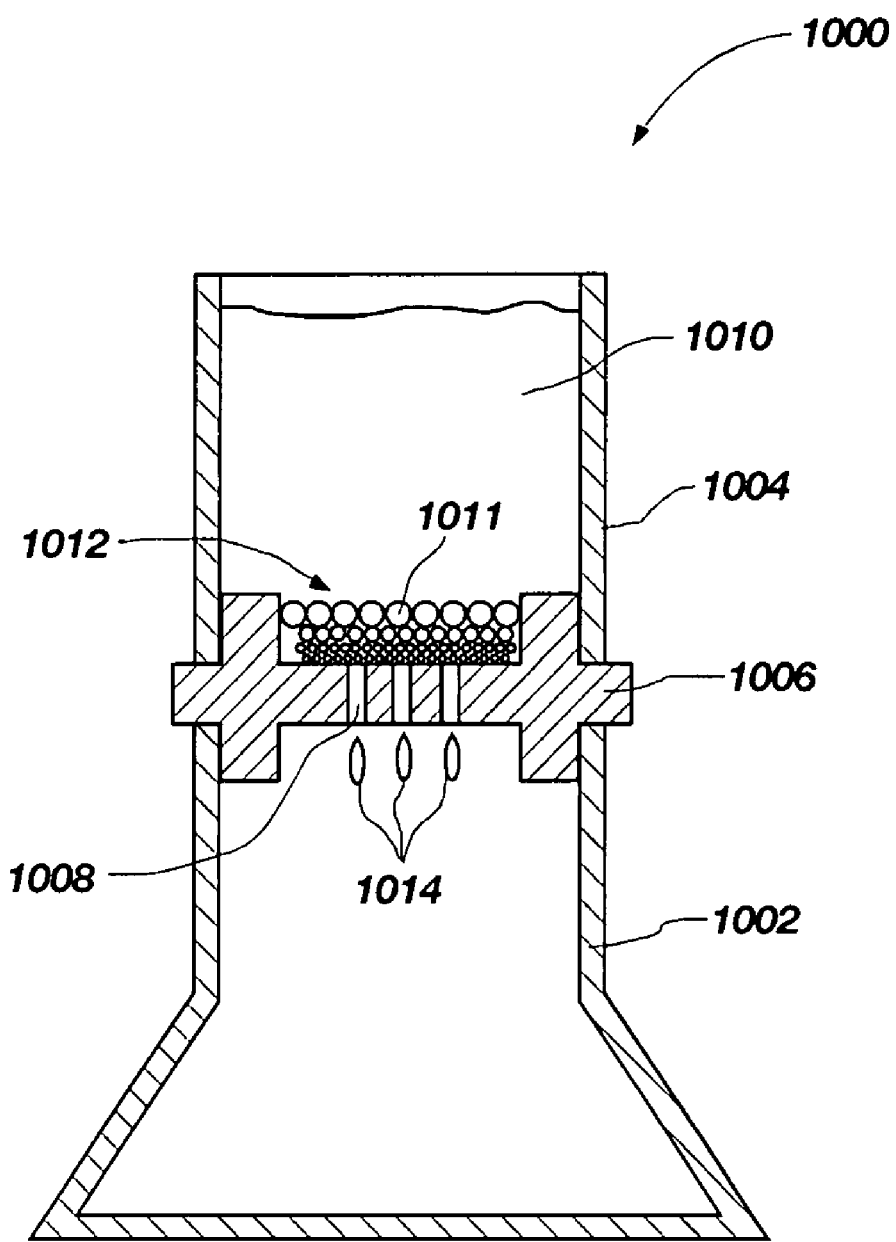
FIGS. 10A-10C are schematic cross-sectional views of apparatuses for forming a precursor superabrasive table according to various embodiments of the present invention.

FIG. 10A is a schematic cross-sectional view of an apparatus 1000 that may be used for forming a precursor superabrasive table that exhibits a substantially monotonic distribution in particle size according to yet another embodiment of the present invention. The apparatus 1000 may include a container 1002, a column 1004, and a filter 1006 connecting the container 1002 and column 1004 together. The filter 1006 includes a plurality of through holes 1008. As shown, the column 1004 may be filled with a liquid suspension 1010 of superabrasive particles 1011 that may comprise a uni-modal, bi-modal, or multi-modal particle size distribution. The liquid suspension 1010 of superabrasive particles 1011 may further include any of the aforementioned deflocculants to help prevent agglomeration of the superabrasive particles 1011. The superabrasive particles 1011 are allowed to settle on the filter 1006, with the largest superabrasive particles adjacent to the through holes 1008 of the filter 1006 to form a precursor superabrasive table 1012 in which the superabrasive particle size decreases substantially monotonically with increasing direction away from the filter 1006. The through holes 1008 of the filter 1006 may be sized so that the largest superabrasive particles 1011 do not pass therethrough. Instead, the liquid of the liquid suspension 1010 may drain through the through holes 1008 of the filter 1006, which is shown as liquid droplets 1014.

After removing the precursor superabrasive table 1012, the precursor superabrasive table 1012 may be shaped, if necessary, placed adjacent to a substrate, and subjected to a HPHT sintering process to form superabrasive compact similar in construction to the superabrasive compact 100 shown in FIG. 1. Alternatively, the precursor superabrasive table 1012 may be subjected to a HPHT sintering process to form superabrasive table that may be subsequently bonded to a substrate (e.g., by brazing or a second HPHT process) to form a superabrasive compact similar in construction to the superabrasive compact 100 shown in FIG. 1.

Figure 10B:
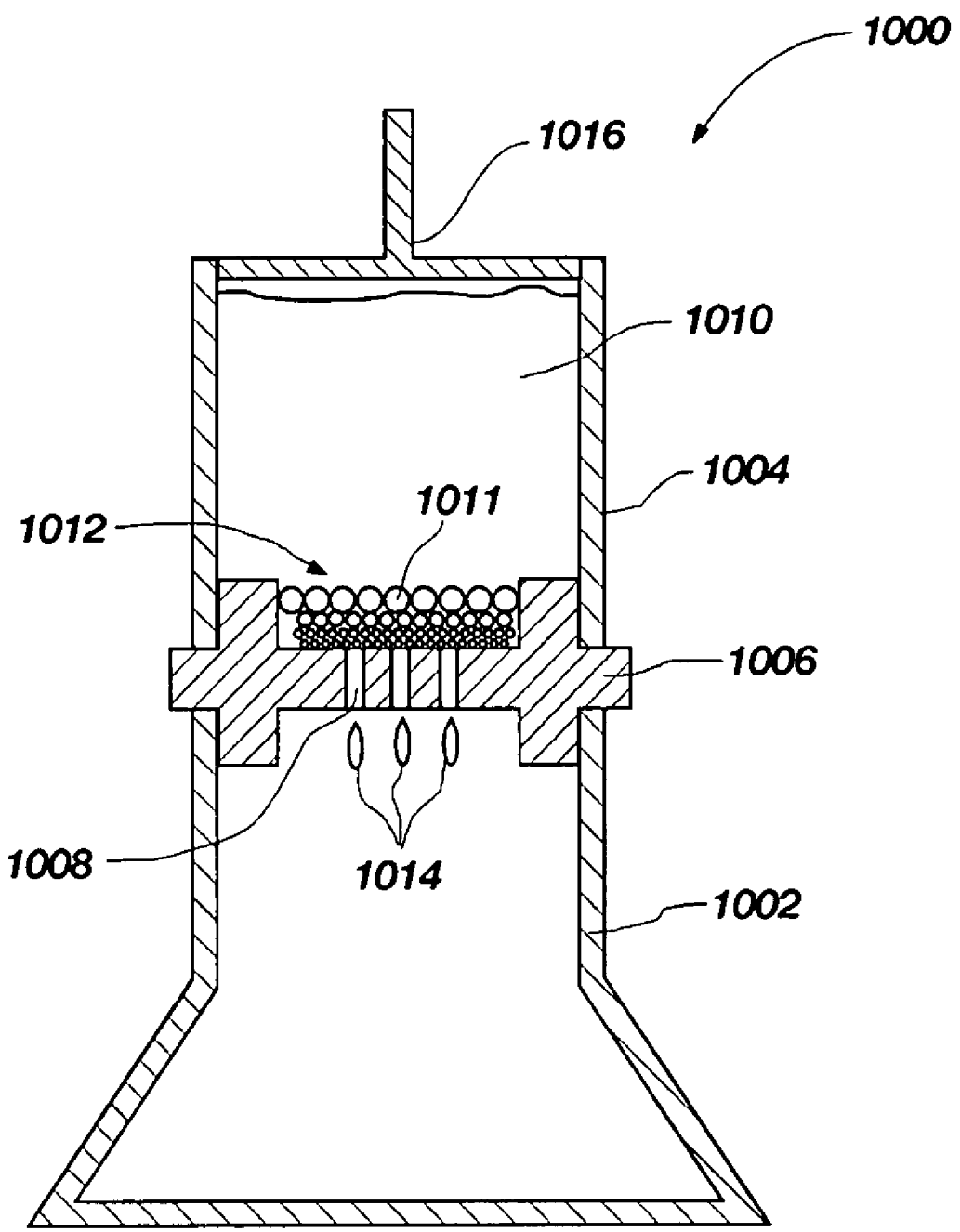
Figure 10C:
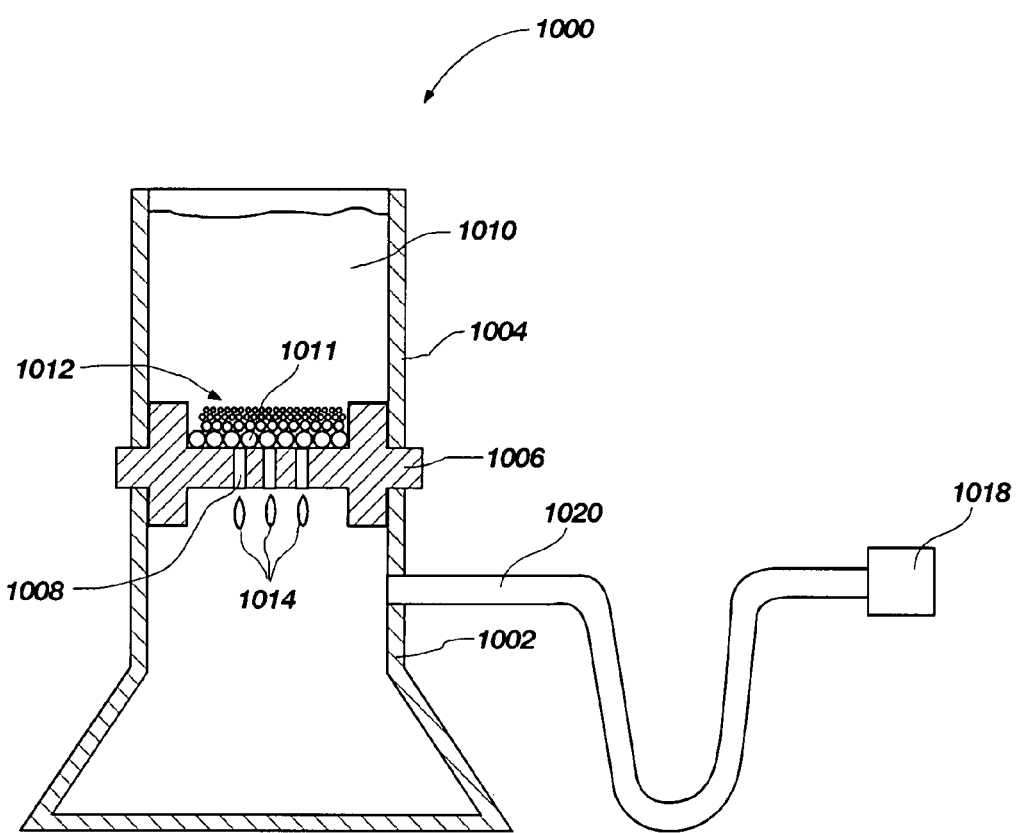

In another method according to an embodiment of the present invention, instead of allowing the superabrasive particles 1011 to settle on the filter 1006, the liquid of the liquid suspension 1010 may be urged through the filter 1006 using, for example, a plunger 1016 shown in FIG. 10B or a vacuum 1018 shown in FIG. 10C. Additionally, the through holes 1008 of the filter 1006 may be sized to allow only a portion of the superabrasive particles 1011 exhibiting a selected particle size range to pass therethrough. Unlike the precursor superabrasive table 1012 shown in FIG. 10A, when the liquid of the liquid suspension 1010 is urged through the filter 1006 at a sufficient rate, the smallest superabrasive particles 1011 of a precursor superabrasive table 1020 so-formed are located adjacent to the filter 1006, with the particle size increasing substantially monotonically with increasing distance away from the filter 1006. The relatively smaller superabrasive particles 1011 are deposited first on the filter 1006 because they may generally move with the fast moving liquid of the liquid suspension 1010, while the relatively larger superabrasive particles 1011 move at a slower rate that may be generally at the Stoke's velocity for the relatively larger superabrasive particles 1011 in the liquid.

Figure 11:
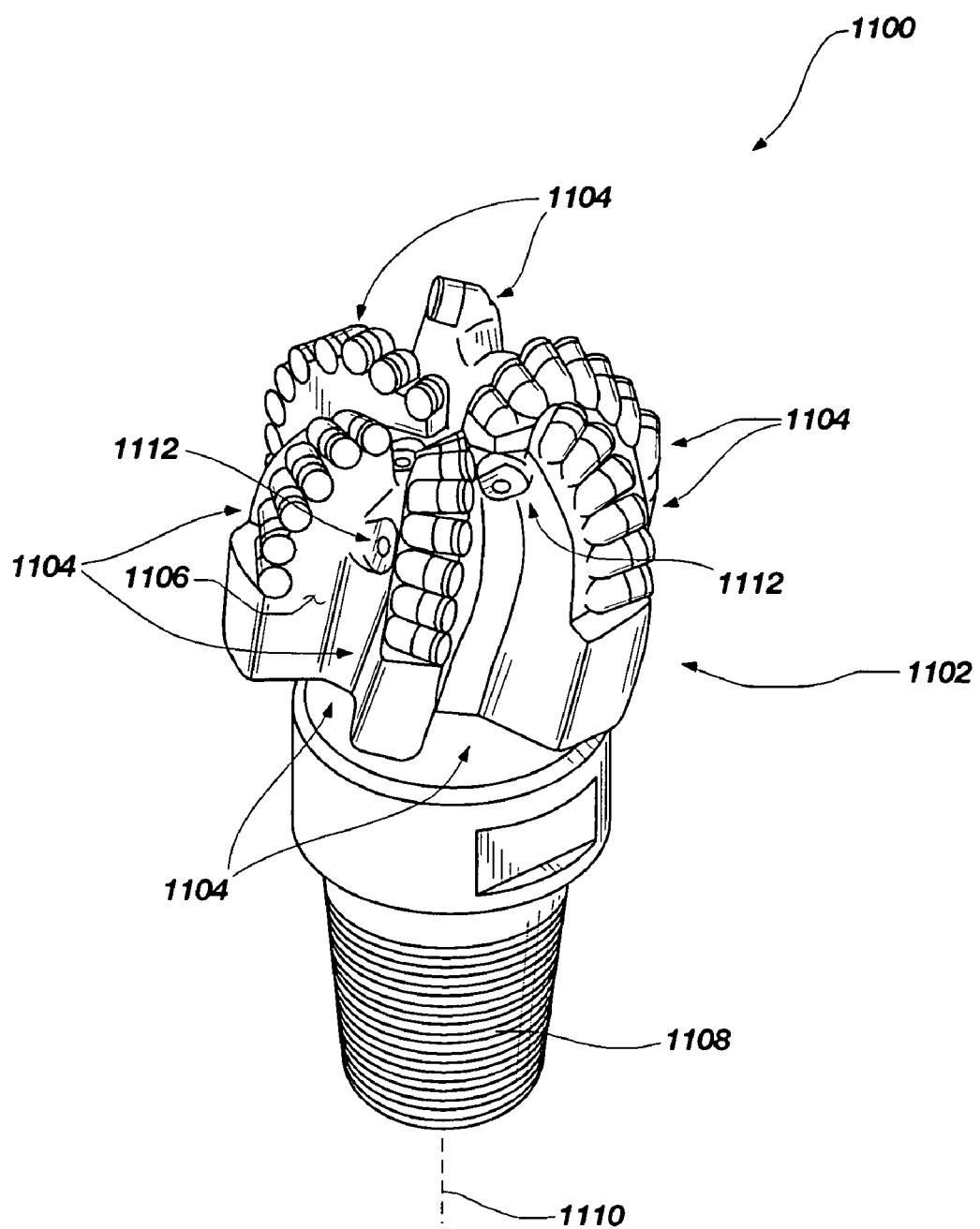
FIG. 11 is an isometric view of one embodiment of a rotary drill bit including at least one superabrasive cutting element comprising a superabrasive compact configured according any of the disclosed superabrasive compact embodiments of the present invention.
Figure 12:
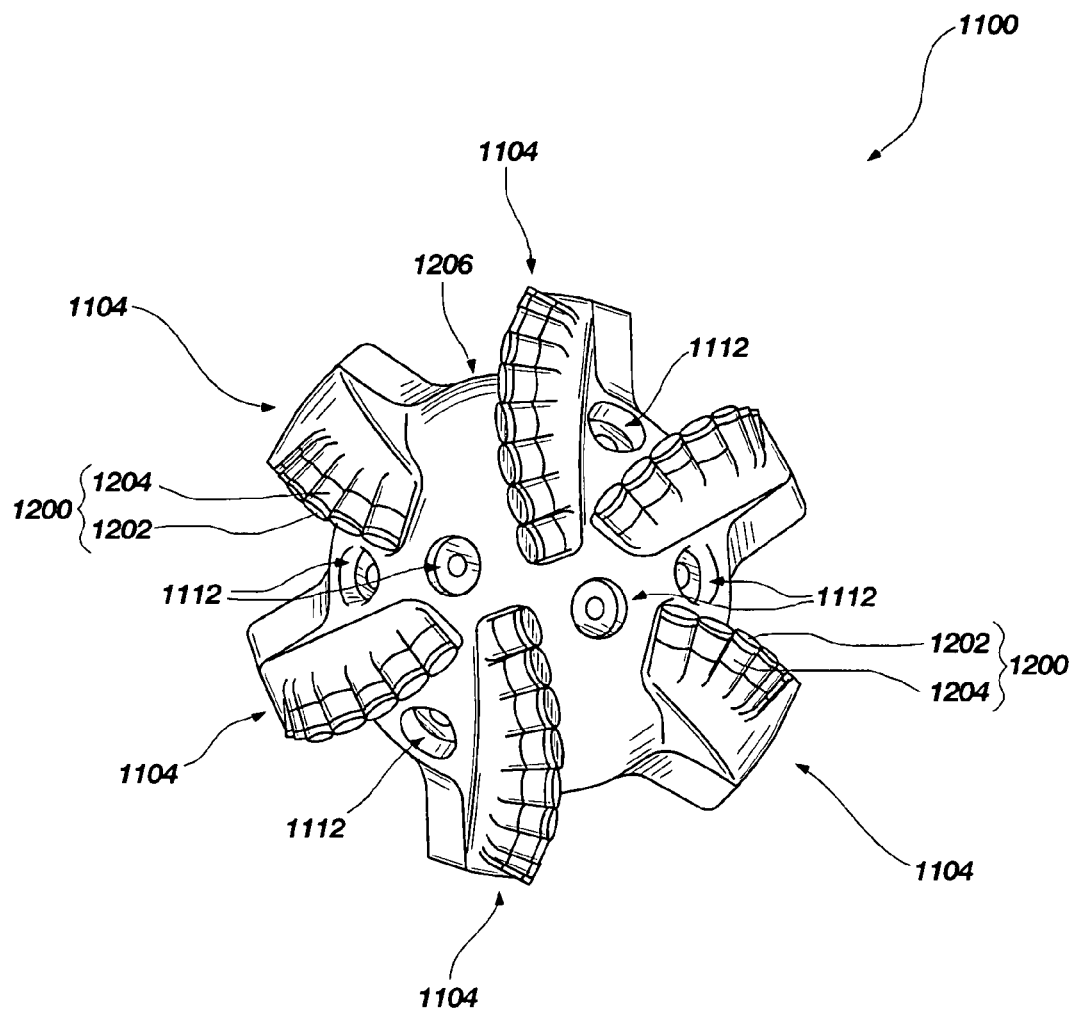
FIG. 12 is a top elevation view of the rotary drill bit shown in FIG. 11.

FIGS. 11 and 12 are isometric and top elevation views, respectively, of a rotary drill bit 1100 according to one embodiment of the present invention. The rotary drill bit 1100 includes at least one superabrasive cutting element configured according to any of the disclosed superabrasive compact embodiments of the present invention. The rotary drill bit 1100 comprises a bit body 1102 that includes radially- and longitudinally-extending blades 1104 with leading faces 1106, and a threaded pin connection 1108 for connecting the bit body 1102 to a drilling string. The bit body 1102 defines a leading end structure for drilling into a subterranean formation by rotation about a longitudinal axis 1110 and application of weight-on-bit.

At least one superabrasive cutting element, configured according to any of the disclosed superabrasive compact embodiments, may be affixed to rotary drill bit 1100. As best shown in FIG. 12, a plurality of cutting elements 1200 are secured to the blades 1106. For example, each of the cutting elements 1200 may include a superabrasive table 1202 bonded to a substrate 1204. More generally, the superabrasive tables 1202 may comprise any of the superabrasive tables disclosed herein, without limitation. In some embodiments of the present invention, the cutting elements 1200 may be formed by separately forming a superabrasive table (i.e., without a substrate) and affixing the superabrasive table to the bit body 1102. For example, structures as previously discussed and disclosed in U.S. Patent Application No. 60/850, 969 may be employed. In addition, if desired, in some embodiments of the present invention, a number of the cutting elements 1200 may be conventional in construction. Also, circumferentially adjacent blades 1104 define so-called junk slots 1206 therebetween for channeling cuttings away from the cutting elements 1200 during drilling. Additionally, the rotary drill bit 1100 includes a plurality of nozzle cavities 1208 for communicating drilling fluid from the interior of the rotary drill bit 1100 to the cutting elements 1200.

FIGS. 11 and 12 merely depict one embodiment of a rotary drill bit that employs at least one cutting element comprising a superabrasive compact configured in accordance with the disclosed embodiments, without limitation. The rotary drill bit 1100, as illustrated and described herein, represents any number of earth-boring tools or drilling tools, including, for example, core bits, roller-cone bits, fixed-cutter bits, percussion bits, eccentric bits, bicenter bits, reamers, reamer wings, or any other downhole tool including superabrasive cutting elements or inserts, without limitation.

The superabrasive compacts disclosed herein may also be utilized in applications other than cutting technology. For example, the disclosed superabrasive compacts may be used in wire dies, bearings, artificial joints, inserts, and heat sinks. Thus, any of the superabrasive compacts disclosed herein may be employed in an article of manufacture including at least one superabrasive element or compact.

Thus, the embodiments of superabrasive compacts disclosed herein may be used on any apparatus or structure in which at least one conventional PCD element or compact is typically used. For example, in one embodiment of the present invention, a rotor and a stator (i.e., a thrust-bearing apparatus) may each include a superabrasive compact according to any of the embodiments disclosed herein and may be operably assembled to a downhole drilling assembly. U.S. Pat. Nos. 4,410,054; 4,560,014; 5,364,192; 5,368,398; and 5,480,233, the disclosure of each of which is incorporated herein, in its entirety, by this reference, disclose subterranean drilling systems within which bearing apparatuses utilizing superabrasive compacts disclosed herein may be incorporated. The embodiments of superabrasive compacts disclosed herein may also form all or part of heat sinks, wire dies, bearing elements, cutting elements, cutting inserts (e.g., on a roller cone type drill bit), machining inserts, or any other article of manufacture as known in the art. Other examples of articles of manufacture that may use any of the superabrasive compacts disclosed herein are disclosed in U.S. Pat. Nos. 4,811,801; 4,274,900; 4,268,276; 4,468,138; 4,738,322; 4,913,247; 5,016,718; 5,092,687; 5,120,327; 5,135,061; 5,154,245; 5,460,233; 5,544,713; and 6,793,681, the disclosure of each of which is incorporated herein, in its entirety, by this reference.

Although the present invention has been described in terms of particular embodiments, it is not intended that the present invention be limited to these embodiments. Modifications within the spirit of the present disclosure will be apparent to those skilled in the art. For example, in other embodiments of the present invention, one or more intermediate layers may be disposed between a substrate and a superabrasive table. For example, a PCD layer, a refractory metal barrier layer, or both may be disposed between the substrate and the disclosed superabrasive tables. In another embodiment of the present invention, the disclosed superabrasive tables may be leached to remove some or substantially all of the metal-solvent catalyst from a selected region thereof.

Although the present invention has been disclosed and described by way of some embodiments, it is apparent to those skilled in the art that several modifications to the described embodiments, as well as other embodiments of the present invention are possible without departing from the spirit and scope of the present invention. Additionally, the words "including" and "having," as used herein, including the claims, shall have the same meaning as the word "comprising."

The invention claimed is:

1. A polycrystalline diamond compact, comprising:
a substrate; and
a polycrystalline diamond table attached to the substrate, the polycrystalline diamond table including an interfacial surface bonded to the substrate and an opposing cutting surface, the polycrystalline diamond table including diamond grains exhibiting a substantially constant average grain size in a thickness direction, the polycrystalline diamond table further including a metal-containing constituent exhibiting a substantially monotonic concentration distribution that decreases toward the cutting surface, substantially each value of the substantially monotonic concentration distribution being less than a previous value.

2. The polycrystalline diamond compact of claim 1 wherein the metal-containing constituent comprises at least one of metal carbide particles or cemented metal carbide particles.

3. The polycrystalline diamond compact of claim 1 wherein the substrate comprises a cemented carbide substrate.

4. The polycrystalline diamond compact of claim 1 wherein the substantially monotonic concentration distribution is a stepped distribution.

5. The polycrystalline diamond compact of claim 1 wherein the substantially monotonic concentration distribution is substantially linear.

6. The polycrystalline diamond compact of claim 1 wherein the metal-containing constituent comprises metal carbide particles.

7. The polycrystalline diamond compact of claim 1 wherein the metal-containing constituent comprises cemented metal carbide particles.

8. The polycrystalline diamond compact of claim 1 wherein the polycrystalline diamond table comprises a region at least proximate to the cutting surface that is substantially free of the metal-containing constituent.

9. A rotary drill bit including a bit body adapted to engage a subterranean formation during drilling and at least one polycrystalline diamond cutting element affixed to the bit body, wherein the at least one polycrystalline diamond cutting element comprises the polycrystalline diamond compact according to claim 1.

10. A polycrystalline diamond compact, comprising:
a substrate; and
a polycrystalline diamond table attached to the substrate, the polycrystalline diamond table including an interfacial surface bonded to the substrate and an opposing cutting surface, the polycrystalline diamond table including diamond grains exhibiting a substantially monotonic grain size distribution that decreases toward the cutting surface, substantially each value of the substantially monotonic grain size distribution being less than a previous value, the polycrystalline diamond table further including a metal-containing constituent exhibiting a substantially monotonic concentration distribution that decreases toward the cutting surface, substantially each value of the substantially monotonic concentration distribution being less than a previous value.

11. The polycrystalline diamond of claim 10 wherein the substrate comprises a cemented carbide substrate.

12. The polycrystalline diamond of claim 10 wherein the substantially monotonic concentration distribution of the diamond grains and/or the metal-containing constituent is stepped distribution.

13. The polycrystalline diamond of claim 10 wherein the substantially monotonic concentration distribution of the diamond grains and/or the metal-containing constituent is substantially linear.

14. The polycrystalline diamond compact of claim 10 wherein the metal-containing constituent comprises metal carbide particles.

15. The polycrystalline diamond compact of claim 10 wherein the metal-containing constituent comprises cemented metal carbide particles.

16. The polycrystalline diamond compact of claim 10 wherein the metal-containing constituent comprises metal carbide particles, cemented metal carbide particles, or combinations thereof.

17. The polycrystalline diamond compact of claim 10 wherein the polycrystalline diamond table comprises a region at least proximate to the cutting surface that is substantially free of the metal-containing constituent.

18. A rotary drill bit including a bit body adapted to engage a subterranean formation during drilling and at least one polycrystalline diamond cutting element affixed to the bit body, wherein the at least one polycrystalline diamond cutting element comprises the polycrystalline diamond compact according to claim 10.

* * * * *